(12) United States Patent
An

(10) Patent No.: US 7,398,287 B2
(45) Date of Patent: Jul. 8, 2008

(54) FAST LINEAR FEEDBACK SHIFT REGISTER ENGINE

(75) Inventor: Wei An, Waltham, MA (US)

(73) Assignee: Analog Devices, Inc., Norwood, MA (US)

( * ) Notice: Subject to any disclaimer, the term of this patent is extended or adjusted under 35 U.S.C. 154(b) by 511 days.

(21) Appl. No.: 10/643,777

(22) Filed: Aug. 19, 2003

(65) Prior Publication Data

US 2004/0090907 A1    May 13, 2004

Related U.S. Application Data

(60) Provisional application No. 60/404,822, filed on Aug. 19, 2002, provisional application No. 60/404,654, filed on Aug. 20, 2002.

(51) Int. Cl.
*G06F 1/02*    (2006.01)
*H04B 1/00*    (2006.01)

(52) U.S. Cl. .................................. 708/252; 375/149

(58) Field of Classification Search .......... 708/252, 708/253; 375/149
See application file for complete search history.

(56) References Cited

U.S. PATENT DOCUMENTS

| | | | |
|---|---|---|---|
| 5,796,776 A | 8/1998 | Lomp et al. | |
| 5,835,528 A | 11/1998 | Barron | |
| 5,926,070 A | 7/1999 | Barron et al. | |
| 6,005,888 A | 12/1999 | Barron | |
| 6,272,168 B1 | 8/2001 | Lomp et al. | |
| 6,282,230 B1 | 8/2001 | Brown et al. | |
| 6,295,301 B1* | 9/2001 | Asano | 370/514 |
| 6,339,781 B1 | 1/2002 | Sasaki | |
| 6,445,714 B1 | 9/2002 | d'Anjou et al. | |
| 6,526,427 B1 | 2/2003 | Chiskis et al. | |
| 6,556,555 B1 | 4/2003 | Miller et al. | |
| 6,594,680 B1 | 7/2003 | Gu et al. | |
| 2001/0003530 A1 | 6/2001 | Sriram et al. | |

FOREIGN PATENT DOCUMENTS

WO    WO 01/16699 A1    3/2001

* cited by examiner

*Primary Examiner*—Chuong D Ngo
(74) *Attorney, Agent, or Firm*—Wolf, Greenfield & Sacks, P.C.

(57) ABSTRACT

A method of generating a pseudo-noise sequence without masking a linear feedback shift register (LFSR) generator is provided. An offset pseudo-noise sequence is generated at a desired offset from a reference psuedo-noise sequence by determining a corresponding initial state vector of the LFSR based on an arbitrary mask.

65 Claims, 23 Drawing Sheets

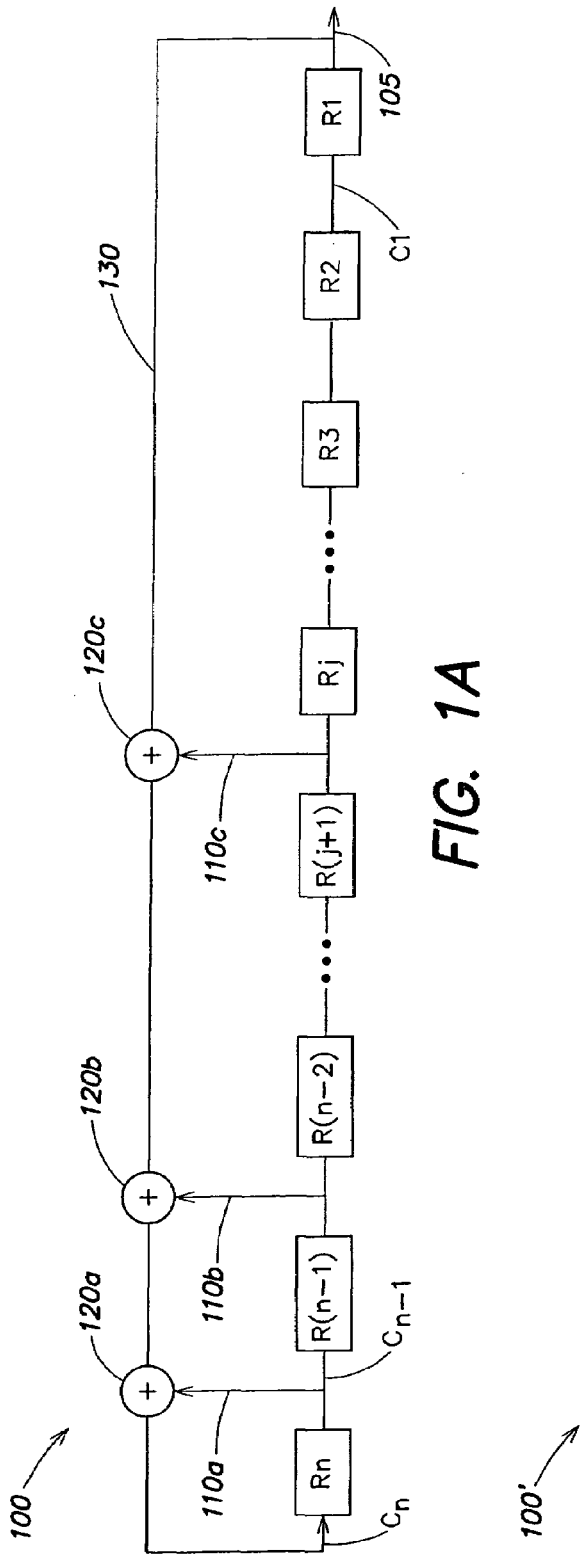
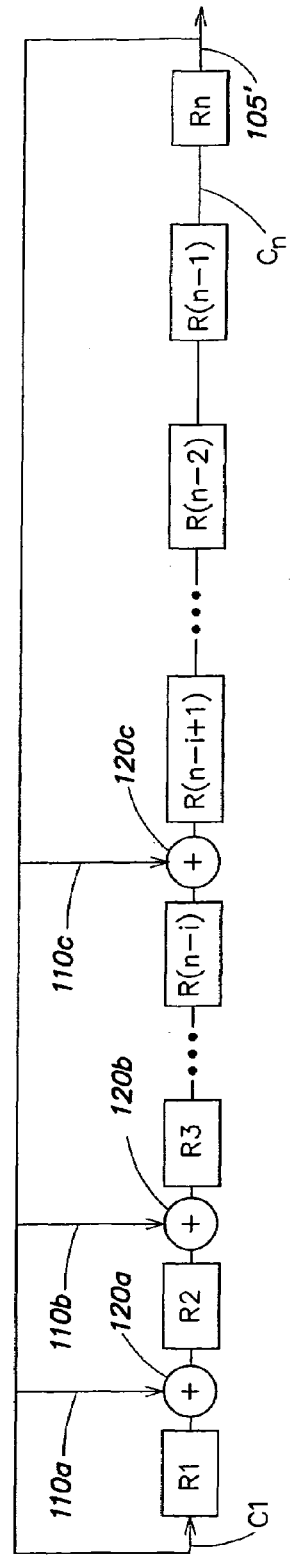
FIG. 1A
FIG. 1B $p(x) = x^{42} + x^{35} + x^{33} + x^{27} + x^{26} + x^{25} + x^{22} + x^{21} + x^{19} + x^{18} + x^{17} + x^{16} + x^{10} + x^7 + x^6 + x^5 + x^3 + x^2 + x^1 + 1$

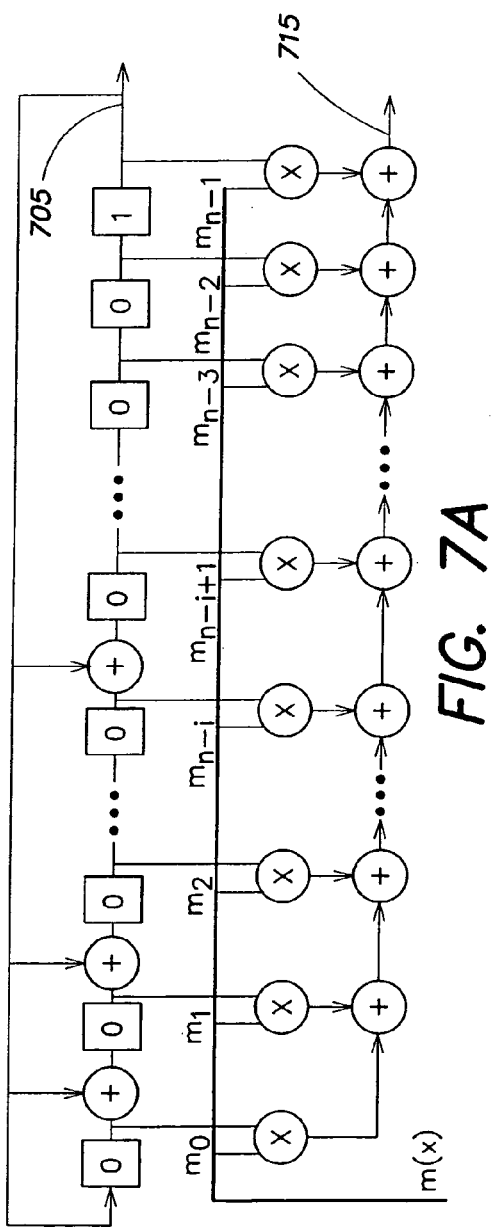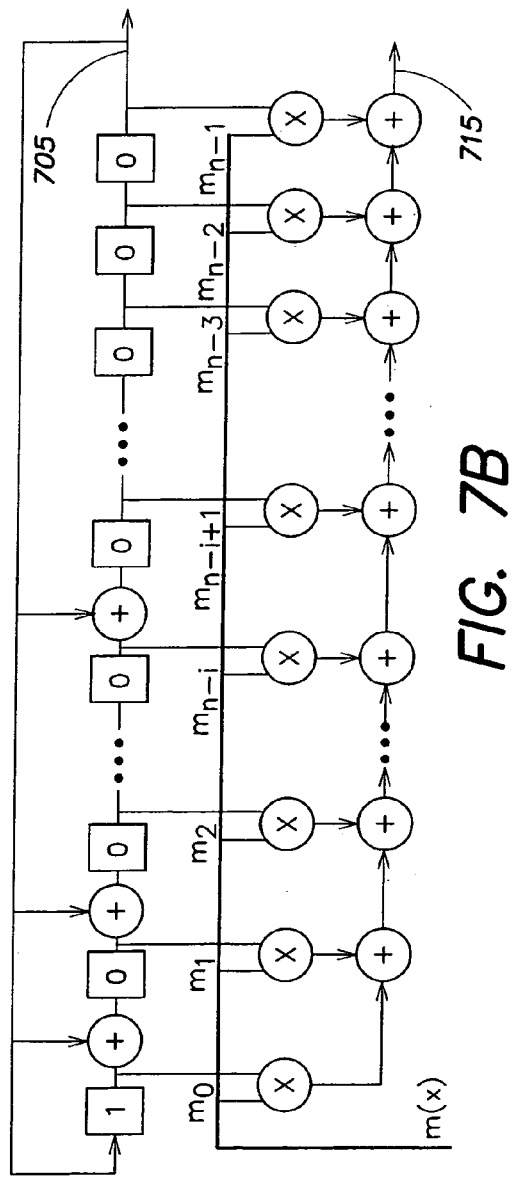

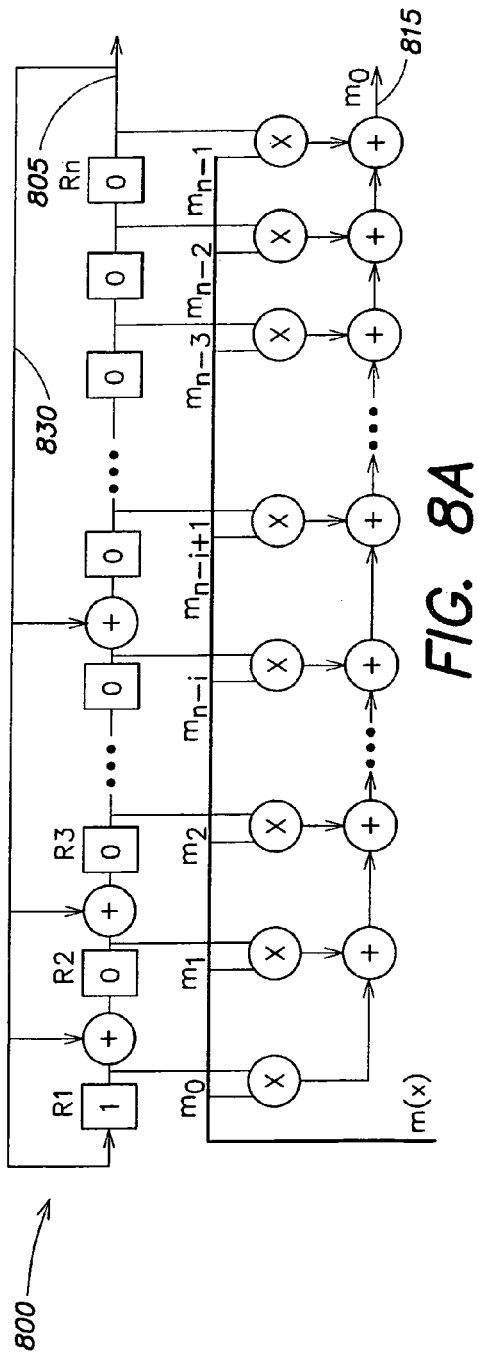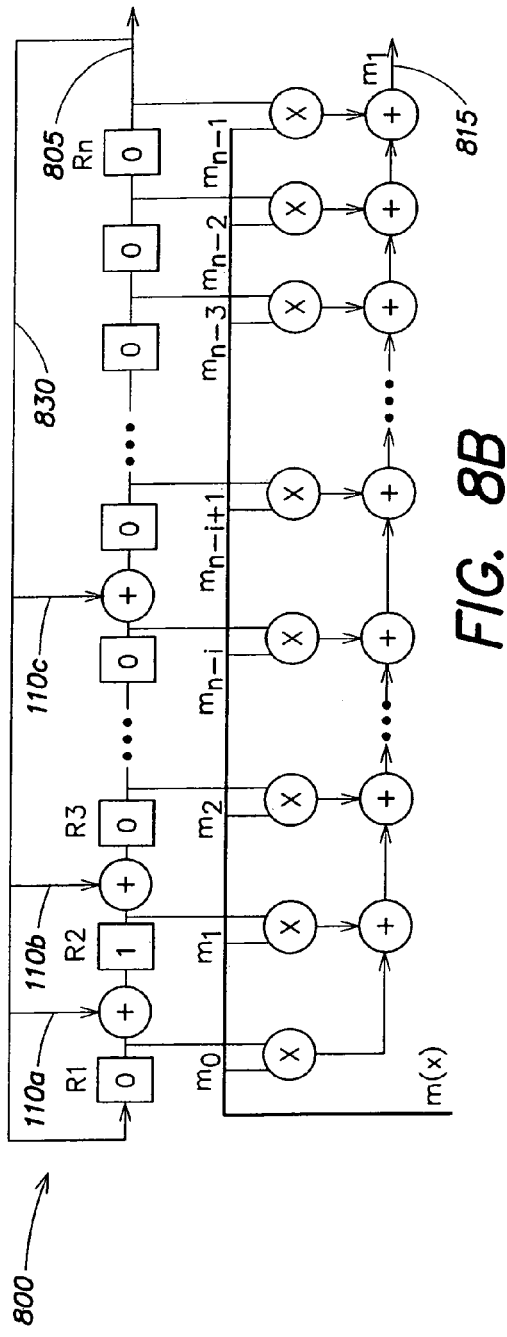
FIG. 8A
FIG. 8B

FAST LINEAR FEEDBACK SHIFT REGISTER ENGINE

CROSS-REFERENCES TO RELATED APPLICATIONS

This application claims the benefit under 35 U.S.C. §119(e) of U.S. Provisional Application 60/404,822, filed Aug. 19, 2002, entitled "SOFTWARE PSEUDO-NOISE GENERATION," by An, and U.S. Provisional Application 60/404,654, filed Aug. 20, 2002, entitled "FAST LFSR ENGINE," by An. The aforementioned applications are incorporated herein by reference in their entirety.

FIELD OF THE INVENTION

The present invention relates to generating pseudo-noise (PN) sequences for various applications including, for example, code division multiple access (CDMA) data communications. More particularly, the present invention relates to linear feedback register (LFSR) generators and methods of generating PN sequences at speeds suitable, for example, for software implementation.

BACKGROUND OF THE INVENTION

Pseudo-noise (PN) sequences, also referred to as PN codes, have been employed in various applications including data encryption and security, wireless communications, etc. For example, code division multiple access (CDMA) communications systems often employ PN codes to enable transmission of multiple signals using a common channel (e.g., over the same frequency band). A transmitter may transmit a data communications signal modulated by a unique PN code over a frequency band shared by the one or more other transmitters. The data communications signal may be demodulated by one or more receivers by demodulating the data communications signal with a local replica of the same PN code.

PN codes have the generally desirable characteristic that signals modulated and demodulated with the same PN code appear strongly correlated while all other signals modulated and demodulated with different PN codes appear as background noise. Accordingly, multiple signals transmitted over the same channel may be distinguished from one another by demodulating appropriately with the respective PN code employed during transmission of the signal.

Many applications, such as wireless communications, have benefited from the capability of PN codes to facilitate CDMA communications. Various groups in the telecommunications industry have developed the CDMA2000 standard, which provides provides, inter alia, PN codes that may be used in $3^{rd}$ generation networks to deliver wireless and mobile services in a CDMA environment. Other standards exist including the Universal Mobile Telephone System (UMTS), W-CDMA, etc. Accordingly, multiple cellular devices may communicate simultaneously with one or more base stations over the same frequency band, thus preserving the frequency spectrum for other types and forms of wireless transmission.

PN codes may be generated using a linear feedback shift register (LFSR). Due to the relatively stringent time constraints often placed on PN code generation, LFSR generators have conventionally been implemented on dedicated hardware. For example, a conventional LFSR generator may be implemented on an ASIC or FPGA. However, hardware implementations may be expensive and/or inflexible.

In addition, the telecommunications industry has increasingly relied upon digital signal processors (DSP) to handle the various signal processing tasks and computations involved in data communications, for example, to handle the relatively large amount of computations required to support an expanding cellular communications network. Accordingly, it may be desirable to have a general purpose DSP capable of both handling traditional signal processing tasks and generating PN codes for data transmission in CDMA environments, or in other applications that utilize PN codes and may require PN code generators.

SUMMARY OF THE INVENTION

One embodiment according to the present invention includes a method of generating an offset sequence comprising acts of generating a reference sequence, determining an initial state vector based at least in part on a mask associated with a first offset from the reference sequence, and generating the offset sequence from the first state vector, the offset sequence offset from the reference sequence by the first offset.

Another embodiment according to the present invention includes a computer readable medium encoded with instructions for execution on at least one processor, the instructions, when executed on the at least one processor, performing a method comprising acts of generating a reference sequence, determining an initial state vector based at least in part on a mask associated with a first offset from the reference sequence, and generating the offset sequence from the first state vector, the offset sequence offset from the reference sequence by the first offset.

Another embodiment according to the present invention includes a computer readable medium encoded with instructions for execution on at least one processor, the instructions, when executed on the at least one processor, performing a method for use with a sequence generator having a plurality of states. The method comprises acts of receiving an input including a mask associated with a first offset of a reference sequence of the sequence generator, and determining a first state of the plurality of states based on the input such that when the first state is applied to the sequence generator, an offset sequence at the first offset from the reference sequence is provided.

Another embodiment according to the present invention includes a sequence generator comprising a first component having a plurality of states, the first component configured to generate a reference sequence and an offset sequence, and a second component adapted to receive at least one mask associated with an offset from the reference sequence, the second component configured to determine an initial state from the plurality of states based at least in part on the at least one mask such that when the first component is operated from the initial state, the first component generates the offset sequence offset from the reference sequence by the offset.

Another embodiment according to the present invention includes a method of generating an output sequence produced by a sequence generator having a plurality of states. The method comprises acts of providing at least two bits of a first state of the plurality of states to form a first portion of the output sequence, determining a second state of the plurality of states, the second state advanced from the first state by at least two states, and providing at least two bits of the second state to form a subsequent portion of the output sequence.

Another embodiment according to the present invention includes a sequence generator comprising a register for storing a current state vector defining one of a plurality of states, the register adapted to provide at least two bits of the current state vector as an output sequence, and a state generator coupled to the register, the state generator adapted to determine a next state vector advanced from the current state vector by at least two states on each iteration and configured to update the current state vector with the next state vector such that the register provides a next at least two bits of the output sequence on each iteration.

BRIEF DESCRIPTION OF THE DRAWINGS

FIG. 1A illustrates an LFSR in simple shift register generator (SSRG) form;

FIG. 1B illustrates an LFSR in modular shift register generator (MSRG) form;

FIG. 7A illustrates an LFSR in a first special state;

FIG. 7B illustrates an LFSR in a second special state;

DETAILED DESCRIPTION

Figures 2A, 2B:
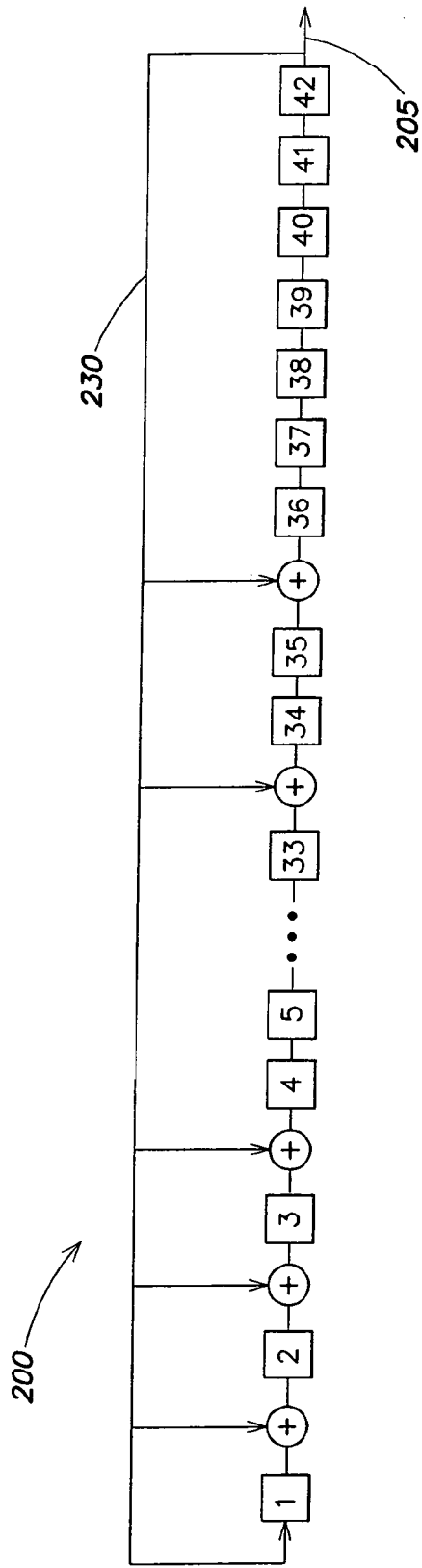
FIG. 2A illustrates a characteristic polynomial defined by the CDMA2000 standard.
FIG. 2B illustrates an LFSR implementing the characteristic polynomial of FIG. 2A.

An effective method of generating PN sequences involves linear feedback shift registers (LFSRs). The term "PN sequence" or "PN code" refers generally to any plurality of values at some phase along a base sequence having pseudo-noise or pseudo-random properties. In general, PN sequences at different phases along the base sequence will be largely uncorrelated as a result of the pseudo-noise property.

An LFSR typically takes one of two forms; a simple shift register generator (SSRG) or a modular shift register generator (MSRG). SSRG is often referred to as the Fibonacci implementation and the MSRG is often referred to as the Galois implementation. FIGS. 1A and 1B illustrate the two forms, respectively.

LSFR 100 in FIG. 1A illustrates the SSRG or Fibonacci form of an LFSR arranged to provide a PN sequence at an output 105. LSFR 100 includes a plurality of storage elements or stages Rn-R1, each storing a single binary value and connected together so as to perform a right shift (i.e., binary values shift from Rn towards R1). For example, storage elements Rn-R1 may be a bank of flip-flops or register operating on a clock. On each clock pulse, the contents of each storage element may be shifted one element to the right via shift connections Cn-C1. The value shifted out of storage element Rn may be provided as output 105 of LSFR 100. Accordingly, on each clock pulse a bit of a binary sequence may be generated.

In addition to the shift connections Cn-C1, LFSR may also include a plurality of feedback connections or "taps" formed at various stages of the LFSR. For example, LFSR 100 includes feedback connections 110a-110c. Each feedback connection provides the output of a corresponding stage of the LFSR to a respective summing element 120a-120c. The summing elements may perform modulo-2 arithmetic on its inputs (i.e., the summing elements may perform a logical exclusive-or (XOR) operation on binary input). A feedback loop 130 is thus formed between storage element Rn and R1, the feedback value provided to Rn resulting from summing register values at each of the plurality of feedback connections. The number and arrangement of feedback connections determines, in part, characteristics of the resulting PN code (e.g., the sequence provided at output 105) as described in further detail below.

LSFR 100' in FIG. 1B illustrates the MSRG or Galois form of a PN code generator. LSFR includes many of the same components as LSFR 100. For example, LSFR includes a plurality of storage elements R1-Rn. However, the arrangement of the storage elements and the feedback connections differ from the configuration of the Fibonacci form. In particular, the storage elements are labeled in reverse order and binary values shift from storage element R1 to Rn. In addition, the feedback loop is directly connected from storage element Rn to R1 via connection C1. In MSRG implementation, the summing elements are arranged along the shift connections rather than along the feedback connections as in the SSRG implementation.

In particular, the feedback connections (i.e., feedback connections 110a-110c and any other connections that may be present but not shown) and associated summing elements (i.e., summing elements 120a-120c and any other summing elements provided by not shown) perform the modulo-2 sum of the feedback value at connection C1 with the values stored at respective stages of the LFSR. The resulting sum is then provided to the subsequent stage of the LFSR. Accordingly, LFSR 100' performs a modular shift. As with LFSR 100, the number and arrangement of feedback connections determines various properties of the binary sequence generated at output 105' and may be chosen to provide particular sequences as described in further detail below.

Both the Galois form and the Fibonacci form are widely used. due in part to a less complicated logic implementation. The output of an LFSR in Fibonacci form will produce the identical sequence of an appropriately connected LFSR in Galois form, provided the initial state of the LFSR is appropriately set up. An LFSR implemented as an SSRG may be converted to an LFSR implemented as an MSRG and vice-versa. Accordingly, various concepts will be described herein in connection with LFSRs implemented in Galois form. However, such concepts apply also to LFSR implementation in Fibonacci form and the invention is not limited to either form. In fact, any implementation capable of generating a suitable PN sequence is considered to be within the scope of the invention.

LFSR generators produce periodic sequences. Conventional LFSR generators typically generate sequences by providing a single value of the sequence, referred to as a "chip" and then iterating to provide subsequent chips in the sequence. For example, LFSR 100' will produce a sequence of chips at output 105' having a period that depends both on the number of stages n in the LFSR and on the arrangement of the feedback connections. An LFSR having n registers has $2^n$ possible states. That is, the n stages of an LFSR can store $2^n$ unique binary numbers. It should be appreciated that should the state of an LFSR repeat, so will the sequence that is generated. Accordingly, the period of a binary sequence generated by an LFSR having n stages will not be greater than $2^n$ chips.

However, an LFSR will only pass through each of the $2^n$ states if the proper feedback connections are provided. That is, the positioning of feedback connections along the LFSR determines, in part, the period of the generated sequence. Accordingly, when provided appropriate feedback connections, an n-stage LFSR generates a sequence having a period of $2^n-1$ chips (the trivial state wherein all stages are zero is generally not considered). Such a sequence is referred to herein as a maximal length sequence or M-sequence.

Various generally desirable properties of M-sequences make them preferable to their non-maximal counterparts. However, the invention is not limited to M-sequences or feedback connections that provide M-sequences. An n-stage LFSR may be characterized by an $n^{th}$ order polynomial. Many properties of LFSR generators and M-sequences have been identified by considering such a so-called "characteristic polynomial" or "generator polynomial." The general form of a characteristic polynomial may be described as, $$p(x)=x^n+p_1x^{n-1}+p_2x^{n-2}+\ldots+p_{n-2}x^2+p_{n-1}x^1+1 \quad \text{Equation 1}$$

where the order of the polynomial represents the number of LFSR stages (e.g., the number of storage elements R) and each term is associated with a respective stage of the LFSR. Coefficients $p_i$ represent the feedback connections of the LFSR. In particular, a non-zero coefficient $p_i$ indicates a feedback connection at the corresponding stage of the LFSR.

As an example, the CDMA2000 standard defines a long code generated by a characteristic polynomial of order 42 to generate an M-sequence having a period of $2^{42}-1$. FIGS. 2A and 2B illustrate the characteristic polynomial 250 and an associated LFSR 200 arranged according to the characteristic polynomial 250, respectively. As shown, each non-zero term in characteristic polynomial 250 has a corresponding connection that provides feedback value 230 to a summing element provided between the output of the associated stage of the LFSR and the input of the subsequent stage. As illustrated by the numbering of the stages, the left most stage of LFSR 200 is associated with the lowest order term (i.e., the zero-order term) of the polynomial and the right most stage is associated with the highest order term. Accordingly, values shifted from stage 42 provide successive bits of an M-sequence provided at output 205. LFSR 200 may be described as implementing characteristic polynomial 250.

Multiple distinct PN codes may be generated from such an M-sequence by forming offset sequences of the M-sequence. For example, each PN code may be a different portion of the M-sequence at a particular phase, that is, each PN code may be offset from some reference point along the M-sequence. Due to pseudo-noise characteristics of the M-sequence, distinct portions of the M-sequence will be generally uncorrelated. As a result, information coded with an offset of an M-sequence can be distinguished from other information coded with other distinct offsets even when transmitted over a common channel. That is, portions of an M-sequence matched in phase will be highly correlated while portions of the M-sequence unmatched in phase will appear as noise.

Figure 3:
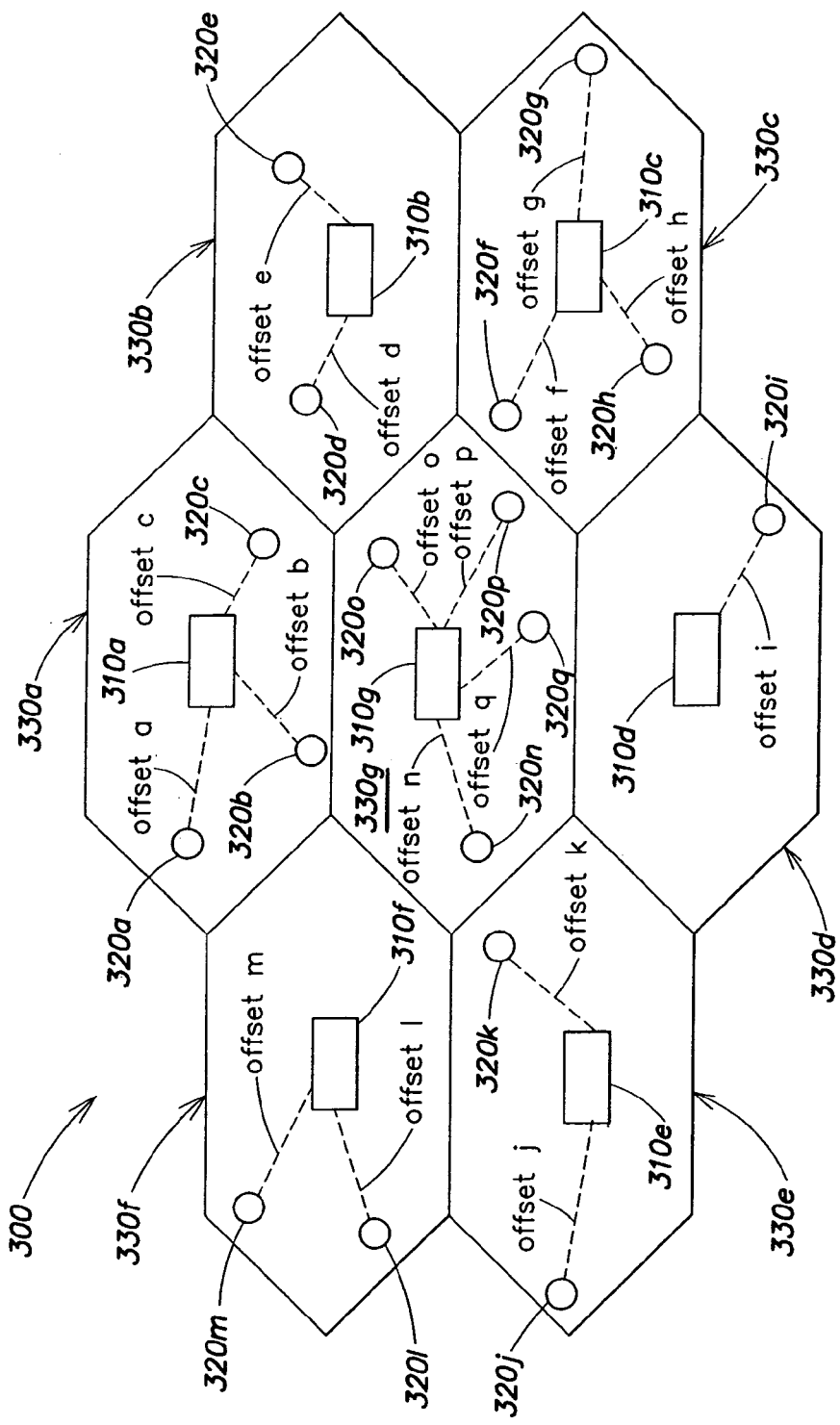
FIG. 3 illustrates a cellular network including a plurality of base stations and transceivers communicating in a CDMA environment.

FIG. 3 illustrates an exemplary cellular network utilizing PN codes for CDMA communications. Cellular network 300 may include a plurality of cells 330a-330g, each having a respective base station 310a-310g. Each base station may provide various communications services to any of various transceivers located in a region defined by the associated cell. For example, at a given time, base station 310a may provide telecommunications service to transceivers 320a, 320b and 320c. The transceivers may be mobile devices requiring telecommunications services such as cellular telephones, hand held devices requiring network access, or any other static or mobile device adapted to communicate with one or more base stations 320. It should be appreciated that the base stations are specific transceivers that typically perform various functions required to form a cellular network and provide communications and network services.

In order to provide such services, a base station must establish a connection with each transceiver in its cell requesting service such that data may be exchanged. It should be appreciated that cellular network 300 may be a portion of a larger network of cells, may be connected to various local area networks (LAN), wide area network (WAN), etc. As such, if each transceiver communicated with a respective base station over separate frequency bands (i.e., distinct channels), the available frequency spectrum would quickly be used up.

In order to avoid saturating the frequency spectrum, cellular network 300 may employ various CDMA techniques such that multiple transceivers may communicate over a common channel. As discussed above, one method of enabling signals to be transmitted over a common channel is to modulate and demodulate signals according to unique PN codes. For example, cellular network 300 may operate by employing a base sequence capable of being generated by the plurality of transceivers in the network. The term "base sequence" refers to a periodic sequence generated by implementing a given characteristic polynomial. A base sequence is typically an M-sequence, however, near maximal or other non-maximal sequences may be suitable base sequences. On example of a base sequence is the M-sequence or long code established by CDMA2000 discussed in connection with FIGS. 2A and 2B.

Exemplary CDMA systems such as cellular network 300 often operate by synchronizing to the same reference sequence. The term "reference sequence" refers to a sequence generated at some phase of a base sequence. For example, a communications system may provide a reference sequence by continually generating bits of a base sequence at a particular rate. Various transceivers in the system may then synchronize to this reference sequence. Accordingly, a transceiver (e.g., a communications device, base station, etc.) may include a generator capable of providing the same base sequence. In addition, each transceiver may generate the base sequence at the same phase as other transceivers in the system. That is, each transceiver may generate the same reference sequence.

In order to enable multiple transceivers to simultaneously communicate with one or more base stations, each transceiver may be assigned a unique offset from the reference sequence. Each transceiver may then modulate information signals by an offset sequence (i.e., a unique PN code) shifted from the reference sequence according to its assigned offset. For example, each transceiver 320a-320q may be assigned a respective unique offset 330a-330q according to which the transceiver modulates transmitted signals. Likewise, each base station may transmit signals to target transceivers according to the unique offset assigned to the transceiver.

When a base station or other transceiver is receiving information, an incoming signal may be demodulated by matching an offset sequence with the offset sequence used to modulate the signal (e.g., by correlating the transmitted signal with the appropriately offset PN sequence). In this manner, information intended for a particular target transceiver may be extracted from the common channel. When the transceiver is a base station or other device that handles multiple simultaneous connections, the various signals transmitted over a common channel may be decoded and properly distinguished. However, to achieve this result, various PN sequence at predetermined offsets may need to be generated at both the transmitting and receiving side of an information exchange.

Figure 4A:
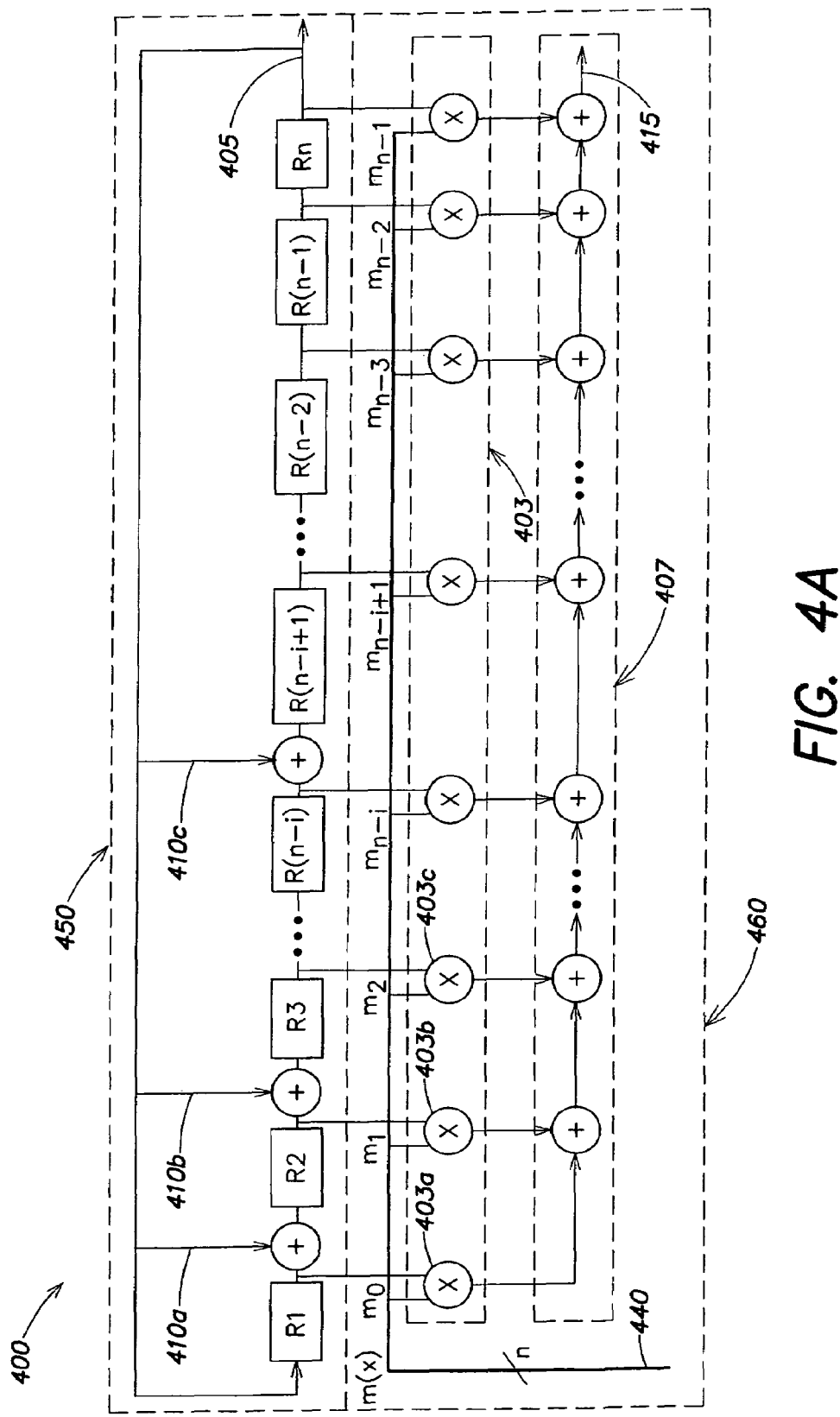
FIG. 4A illustrates a masked LFSR employing masking to provide a sequence at a desired phase of a base sequence.

FIG. 4A illustrates a conventional method of generating offset PN codes by masking an LFSR. PN sequence generator 400 includes an LSFR 450 having desired feedback connections. The term "sequence generator" refers generally to any component adapted to provide a base sequence. A sequence generator may include a component that implements one or more LFSRs as illustrated in FIG. 4A or may include one or more components otherwise arranged that are capable of generating the base sequence as described in more detail below.

The feedback connections in FIG. 4A may be chosen such that LSFR 450 produces an M-sequence. Accordingly, LFSR may continually produce a binary sequence at output 405 having a period of $2^n-1$. In the environment described in FIG. 3, each of the base stations and transceivers may include a sequence generator similar to generator 400 that is in phase or is capable of being placed in phase with one another such that they can produce the same sequence. This sequence may be used by the cellular network as a reference sequence from which various offset sequences may be produced.

Conventional LFSR generators often produce offsets from a reference sequence by providing a mask to the state vector of the LFSR. The term "state" or "state vector" refers generally to a unique configuration of a sequence generator from which a chip (e.g., a bit) of a base sequence at a particular phase is generated. For example, the state vector of an LFSR refers to the n-bit binary number stored in its n stages. The state vector of an LFSR may be masked to provide an offset sequence at output 415 such that output 415 is shifted from the reference sequence provided at output 405.

For example, LSFR 400 includes an offset generator 460 coupled to LFSR 450. Offset generator 460 includes a plurality of multiplication elements 403 having a first input connected to respective outputs of the registers R1-Rn and a second input connected to respective bits of a mask 440 represented as a plurality of bits $m_0$-$m_{n-1}$. The output of multiplication elements 403 may be provided to a plurality of summing elements 407. The summing elements 407 may be connected such that the output of multiplication element 403a is first summed with the output of multiplication element 403b. This sum may then be summed with the output of 403c and so on to provide binary sequence 415.

Masking exploits the so-called "shift-and-add" property of M-sequences. This property is known to those skilled in the art and will not be discussed in detail herein except to say that the property derives from the appreciation that when a portion of an M-sequence is summed with an offset of itself, it produces a portion of the same M-sequence at another offset. Multiplication elements 403 and summing elements 407 form an inner product of the state vector of the LFSR and the mask. This inner product invokes the shift-and-add property such that a binary sequence 415 may be produced at an offset from the reference sequence 405 by an amount depending on the mask 440. Accordingly, multiple offset sequences may be produced from a single reference sequence by applying different masks.

In the network of FIG. 3, each transceiver may have a unique mask assigned to it. The mask may be known by the various base stations or other components adapted to communicate with the transceivers. Accordingly, a base station/ transceiver pair both may be capable of generating an offset sequence corresponding to the mask assigned to the transceiver (i.e., both may be capable of generating the same unique PN code).

Figure 4B:
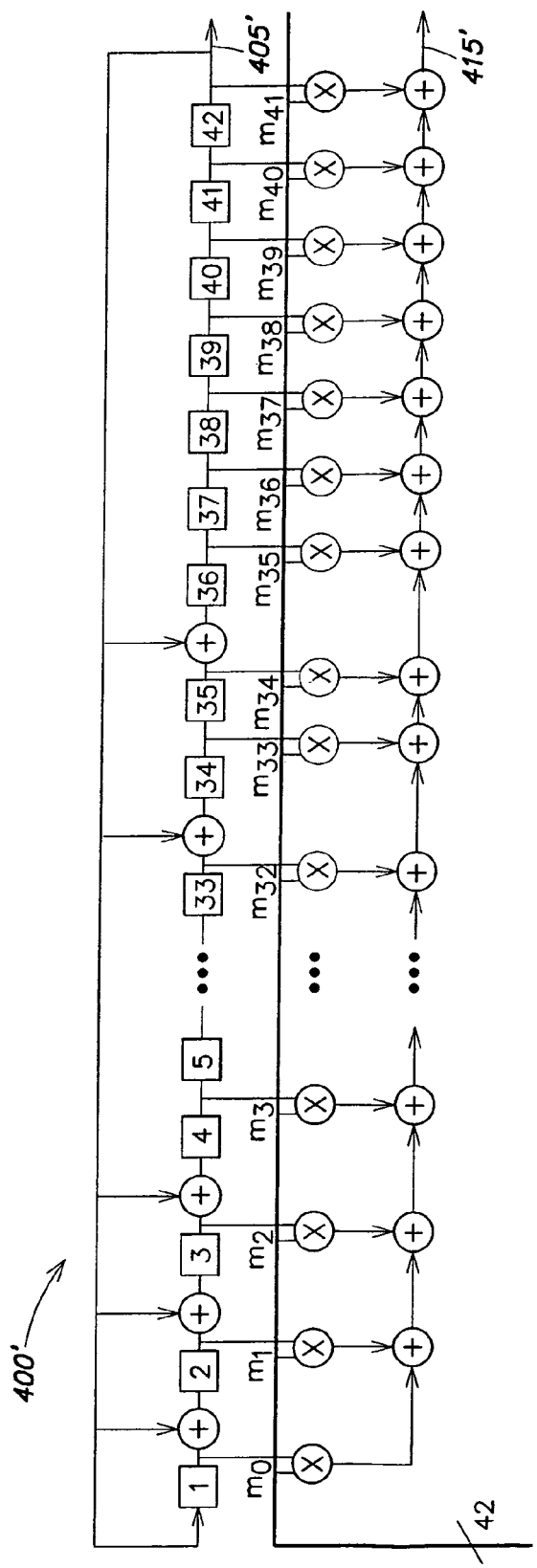
FIG. 4B illustrates a masked LFSR implementing the characteristic polynomial defined in the CDMA2000 standard.
Figure 5:
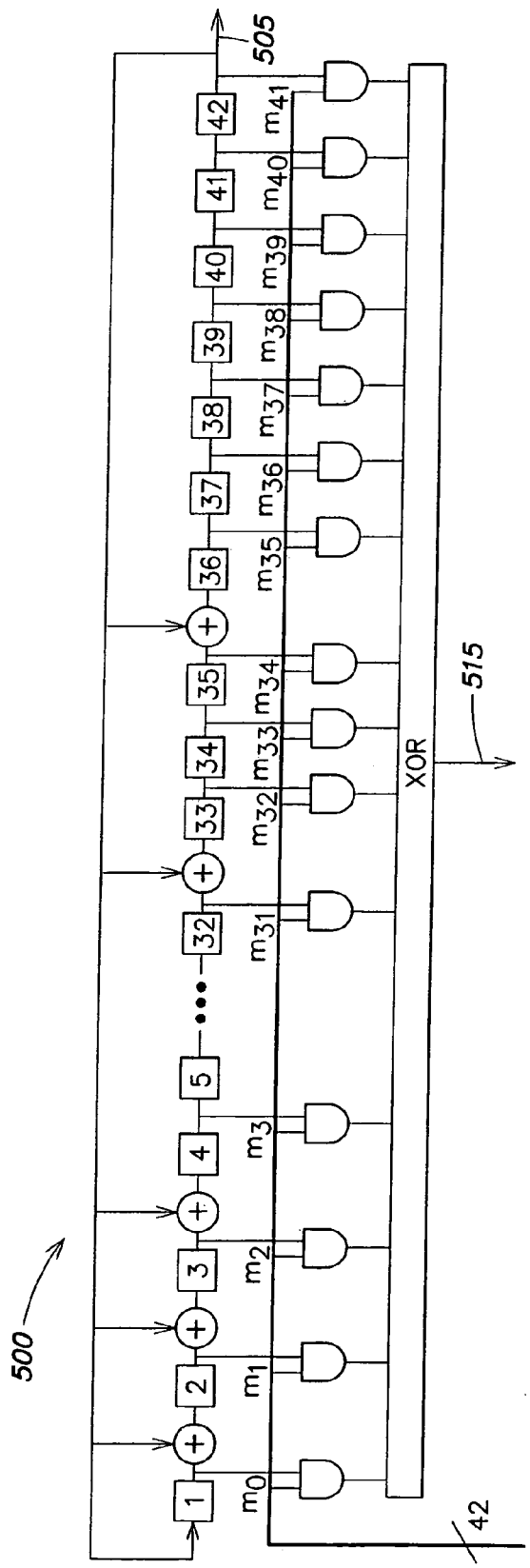
FIG. 5B illustrates the masked LFSR of FIG. 4B, wherein masking is implemented with logic gates.

However, while the LFSR designs of FIGS. 4A and 4B may be well suited for hardware implementations, software implementations may suffer from the relatively expensive computations required to generate both the reference sequence and the offset sequence. For example, in hardware, the n stages may be implemented by individual clocked flip-flops or similar storage elements. Multiplication elements 403 may be implemented as logic AND gates and summing elements 407 may be implemented as exclusive-or (XOR) gates, for example, as illustrated in FIG. 5 by LFSR 500, which may implement the long code specified by the CDMA2000 standard. Accordingly, each successive clock pulse may produce a subsequent bit of the reference sequence at output 505 and a subsequent bit of the offset sequence at output 515. Accordingly, the speed of generating an offset sequence in hardware may be linearly related to clock speed.

It should be appreciated that the sequence generators discussed above (i.e., the LFSR generators illustrated in FIGS. 1-5) and described below may be implemented in software. In particular, the various computations (e.g., summing and multiplying various binary values according to a characteristic polynomial, masking computations, etc.) may be implemented as instructions, for example, of a program encoded in memory and capable of being executed on one or more processors such as a digital signal processor (DSP).

However, providing a reference sequence in software may require a relatively large numbers of clock cycles. For example, the contribution of each feedback connection need to be computed and the state of the LFSR updated. In addition, generating a single bit of an offset sequence requires computing the inner product of two n-bit sequences. When n is large (e.g., 42 bits in CDMA2000), mask computations may prohibit offset sequences from being produced at speeds sufficient to satisfy the relatively stringent requirements of many applications such as cellular communications, etc.

Applicant has appreciated that a non-masked LFSR may produce the same offset sequence as a masked LFSR when placed in an appropriate initial state. Accordingly, one embodiment of a method according to the present invention includes determining an initial state vector from a given mask that, when applied to a non-masked LFSR, generates an offset sequence associated with the given mask. The term "initial state vector" refers to a state vector from which a sequence generator initiates a sequence at some desired phase of a base sequence. That is, the initial state vector provides a first bit of a sequence at some desired phase of a base sequence. As such, operating a sequence generator (e.g., an LFSR) from an initial state vector or from an initial state refers to placing a sequence generator in the initial state to initiate generating a sequence at a corresponding phase of a base sequence. This act may also be referred to as applying an initial state vector or initial state to a sequence generator.

Some aspects of the present invention derive from Applicant's appreciation that a mask produces a sequence at an offset from a reference sequence. Accordingly, a masked LFSR (e.g., LFSR 400) may produce a pair of binary sequences having a phase difference that depends on the mask. As discussed in the foregoing, an LFSR that generates an M-sequence passes uniquely through every $2^n-1$ state vectors associated with the n stages of the LFSR. Accordingly, each state vector produces a bit of the M-sequence at a unique phase.

At some time to, for example, when a mask is applied to an LFSR, the LFSR is in a particular state that generates a first bit of a reference sequence at some phase of a base sequence. At the same time $t_0$, the inner product of the mask and the state vector of the LFSR produces a first bit of an offset sequence. Since the offset sequence and the reference sequence are offset versions of the same base sequence, at some time $t_i$ the reference sequence will achieve the same phase as the offset sequence at time $t_0$. Also at time $t_i$, the LFSR will be in some unique state. That is, a unique state vector of the LSFR corresponds to the first bit of the offset sequence generated by the mask at time $t_0$.

Applicant has recognized that an offset sequence generated by masking an LFSR may be alternatively generated by a non-masked LFSR by applying the appropriate state vector to the LFSR. Accordingly, Applicant has developed methods of generating multiple offset sequences by applying appropriate initial state vectors to a sequence generator to obviate relatively expensive mask computations.

Figure 6:
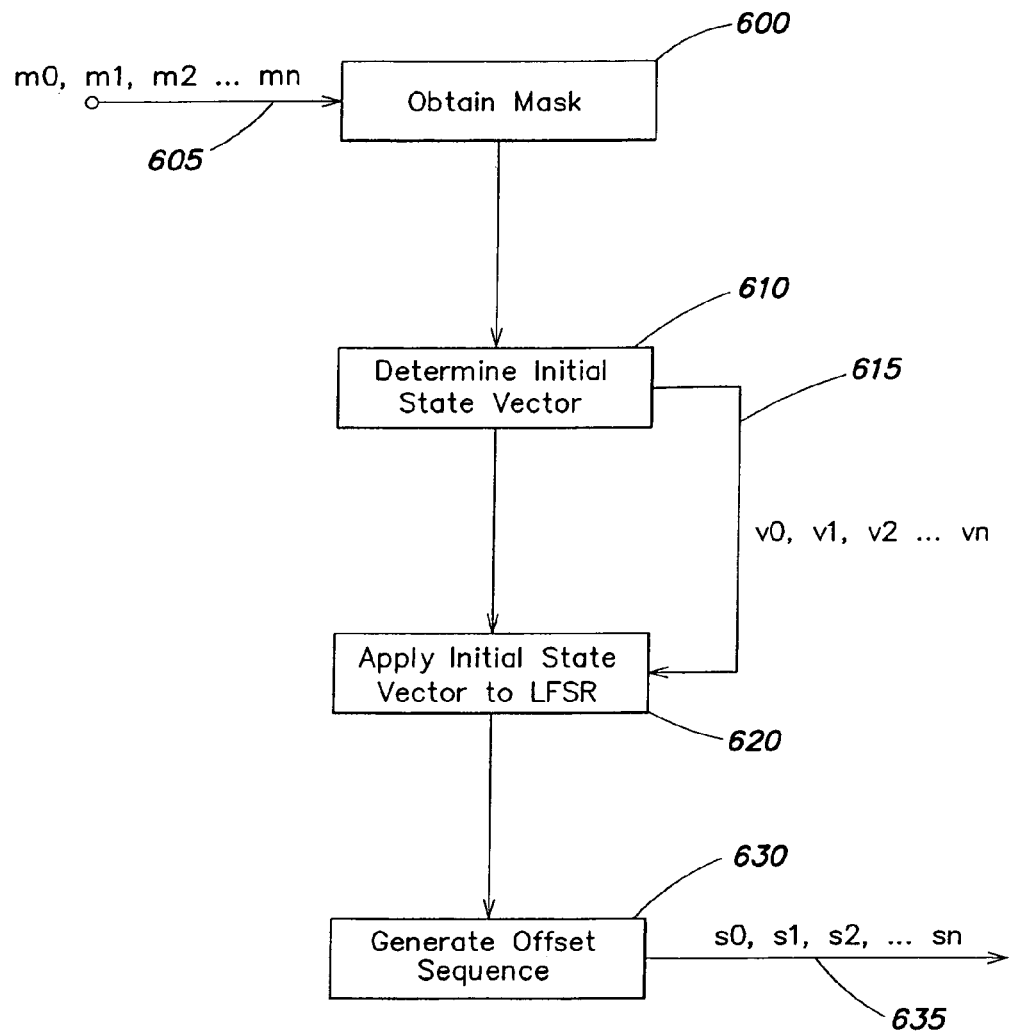
FIG. 6 illustrates one embodiment of a method according to the present invention of generating an offset sequence without masking by determining an initial state vector from the mask that produces the offset sequence when applied to an LFSR.

FIG. 6 illustrates a flow diagram of one embodiment of a method for generating an offset sequence according to the present invention. In step 600, a given mask 605 is obtained. For example, mask 605 may be an n-bit binary number m0-mn configured to provide an offset sequence when applied to the state vector of a sequence generator arranged to provide a reference sequence (not shown).

In step 610, an initial state vector associated with the mask may be determined. In particular, a state vector is computed such that when applied to the sequence generator produces an offset sequence at the same phase as would be produced if the sequence generator was masked by mask 605. For example, an n-bit state vector 615 (e.g., bits $v_0$-$v_n$) may be computed such that when the sequence generator is operated from state vector 615, a desired offset sequence is provided.

In step 620, the state vector 615 is applied to the sequence generator. For example, each stage of an LFSR may take on the value described in the respective bit $v_i$ of state vector 615. When the sequence generator is operated from state vector 615, an offset sequence 635 defined by mask 605 will be generated as shown in step 630.

It should be appreciated that mask 605 may be initially used to compute a corresponding initial state vector of the sequence generator. However, once the initial state vector has been computed and applied to the LFSR, the offset sequence will be generated without having to make relatively expensive mask computations. The computations involved in determining the initial state vector need only be computed each time it is desired to generate a different offset sequence. However, state vector computations are not a function of the number of bits of an offset sequence that is generated. As such, initial vector computations may be viewed as an overhead for switching offset sequences, not as overhead for generating the sequence.

Accordingly, mask removal may reduce the computational expense of generating an offset sequence by an n-bit inner product computation between a state vector of an LSFR and a mask for each bit of the offset sequence that is generated. When an LFSR is implemented in software, this may result in substantial savings in the time required to generate an offset sequence.

The method described above may be employed, for example, in the cellular network 300 illustrated in FIG. 3. For instance, each of the various transceivers may have a unique mask which generates an offset sequence at corresponding phase of a base sequence. Base stations 310 may have stored or otherwise have access to the various masks corresponding to each of the transceivers 320. When communicating with a particular transceiver, a base station may obtain the associated mask, determine the initial state vector associated with the mask and apply the initial state vector to a sequence generator (e.g., an LFSR implemented in hardware or software) included in the base station. Accordingly, the appropriate offset sequence may be generated to facilitate transmitting to and receiving from the corresponding transceiver (e.g., a mobile unit, cellular telephone, etc.).

It should be appreciated that masking exploits the shift-and-add property of M-sequences to generate an offset sequence rather than directly utilizing the LFSR. As such, an initial state vector that produces the offset sequence when applied to the LFSR may not be known. Applicant has identified and developed a method of determining an initial state vector associated with an arbitrary mask for generating a binary sequence in various other information exchange or communications systems where multiple devices are identified and distinguished based on offsets of a reference sequence. As discussed above, an LFSR can be thought of as implementing an $n^{th}$-order polynomial. The general form of a characteristic polynomial is shown in Equation 1.

Each term in the polynomial corresponds to a stage in the LFSR. As discussed above, the output of a masked LFSR (i.e., a sequence offset from a reference sequence) can be made equivalent to the output of a non-masked LFSR by applying an appropriate initial state vector to the LFSR. As such, if the initial state vector that generates a sequence at a desired offset may be computed, relatively expensive mask computations may be eliminated. Accordingly, it may be desirable to be able to determine the initial state vector associated with an arbitrary mask.

As mentioned above, Galois Field Theory has played a role in illuminating various properties of characteristic polynomials, M-sequences and the implementation of code generators in LFSRs. Unless otherwise stated, mathematic operations described herein are Galois Field operations. Relevant binary Galois Field operations are listed below in Tables 1 and 2.

TABLE 1

Galois Field Addition

| 0 | 0 | 0 |
| 0 | 1 | 1 |
| 1 | 0 | 1 |
| 1 | 1 | 0 |

TABLE 2

Galois Field Multiplication

| 0 | 0 | 0 |
| 0 | 1 | 0 |
| 1 | 0 | 0 |
| 1 | 1 | 1 |

Accordingly, Galois field addition performs a logical XOR or modulo-2 operation and Galois field multiplication performs a logical AND operation. It should be appreciated that the summing elements in the various LFSR implementations described above perform Galois Field addition and the various multiplication elements (e.g., for masking computations) perform Galois Field Multiplication. It should be appreciated that Galois Field Theory provides a simplified method of manipulating polynomials and describing corresponding sequence generators. However, standard algebraic operations may also be suitable for describing and implementing a sequence generator and do not depart from the scope of the invention. One embodiment of a method according to the present invention of determining an initial state vector associated with a given mask is described below. Let the current state of a sequence generator (e.g., an LFSR) be represented as, $$g_k(x) = r_n(k) + r_{n-1}(k)x + r_{n-2}(k)x^2 + \ldots + r_2(k)x^{n-2} + r_1(k)x^{n-1}$$ Equation 2 where each $r_i$ denotes the binary value of a respective stage of the sequence generator. Accordingly, $g_k(x)$ represents an n-bit binary number describing the current state of the sequence generator (i.e., $g_k(x)$ may be the state vector of the sequence generator). For example, $g_k(x)$ may describe the state of the sequence generator from which a reference sequence is generated. Let an arbitrary mask be represented as, $$m(x) = m_0 + m_1 x + m_2 x^2 + \ldots + m_{n-2} x^{n-2} + m_{n-1} x^{n-1}$$ Equation 3 where each $m_i$ is associated with a respective term of the current state vector $g_k(x)$. As described above, the application of m(x) provides an offset sequence shifted from a reference sequence represented by $g_k(x)$. This masking operation may be performed in implementation as the inner product of the coefficients of $g_k(x)$ and m(x). However, the computation of such an n-bit inner product for each bit of an offset sequence generated is generally too computationally expensive to be implemented in software. Accordingly, it may be desirable to eliminate this operation. Let an initial state vector that will generate a desired offset sequence be represented as, $$g_k'(x) = r_n'(k) + r_{n-1}'(k)x + r_{n-2}'(k)x^2 + \ldots + r_2'(k)x^{n-2} + r_1'(k)x^{n-1}$$ Equation 4

Accordingly, if $g_k'(x)$ can be determined, the sequence generator may be placed in the state defined by $g_k'(x)$ such that it generates a desired offset sequence without requiring masking computations. In particular, initial state vector $g_k'(x)$ generates an offset sequence from a non-masked LFSR equal to the offset sequence generated by a masked LFSR with state $g_k(x)$ using mask m(x). A prime (') is used herein to indicate that the expression is associated with a non-masked sequence generator.

It is noted that equations 2 and 4 have been expressed with an index k. As discussed in the foregoing, a sequence generator configured to generate an M-sequence will pass through each of the possible $2^n$ states (except the zero state) of the n stages of the sequence generator during a single period of the M-sequence. Accordingly, each state vector can be considered as an offset from a special reference state vector. Let a first special state vector at k=0 be defined as, $$g_0(x) = 1$$ Equation 5

In state $g_0(x)$, only the right-most stage in a right-shifted register has a value of 1, and all other stages have a value of 0. FIG. 7A illustrates an LFSR in state $g_0(x)$. It should be appreciated that this state corresponds to a phase of the base sequence. That is, when an LFSR is operated from state $g_0(x)$, it will generate the associated base sequence at a particular and unique phase at output 705. When the same LFSR is masked with m(x), an offset sequence may be produced at output 715. Since the offset sequence is also at a phase of the base sequence, there is a state vector $g_0'(x)$ that, if applied to a non-masked LFSR, would produce the base sequence at the same phase as the offset sequence. Stated differently, there is some state $g_0'(x)$ that yields the base sequence at the same offset or phase as yielded by masking $g_0(x)$ with m(x).

It can be shown that if the state $g_0'(x)$ of a non-masked LFSR corresponding to the masked LFSR at state $g_0(x)$ can be found, then any state $g_k'(x)$ of a non-masked LFSR corresponding to the masked LFSR at an arbitrary state $g_k(x)$ (e.g., the current state of the LFSR) may be determined according to the relationship, $$g_k'(x) = \mod\{g_0'(x) \cdot g_k(x), p(x)\}$$ Equation 6 where the mod{x, y} operation performs the modulus or remainder of x divided by y, where division is a Galois field operation. However, $g_0'(x)$ may not be trivially computed from $g_0(x)$. To address this, a second special state is defined as, $$g_{n-1}(x) = x^{n-1}$$ Equation 7

In state $g_{n-1}(x)$, only the left-most stage in a right-shifted register has a value of 1, and all other stages have a value of 0. FIG. 7B illustrates an LFSR in state $g_{n-1}(x)$. The second special state may be preferable as a reference state vector because the corresponding state $g_{n-1}'(x)$ of the non-masked LSFR may be determined from the second special state.

Figure 8C:
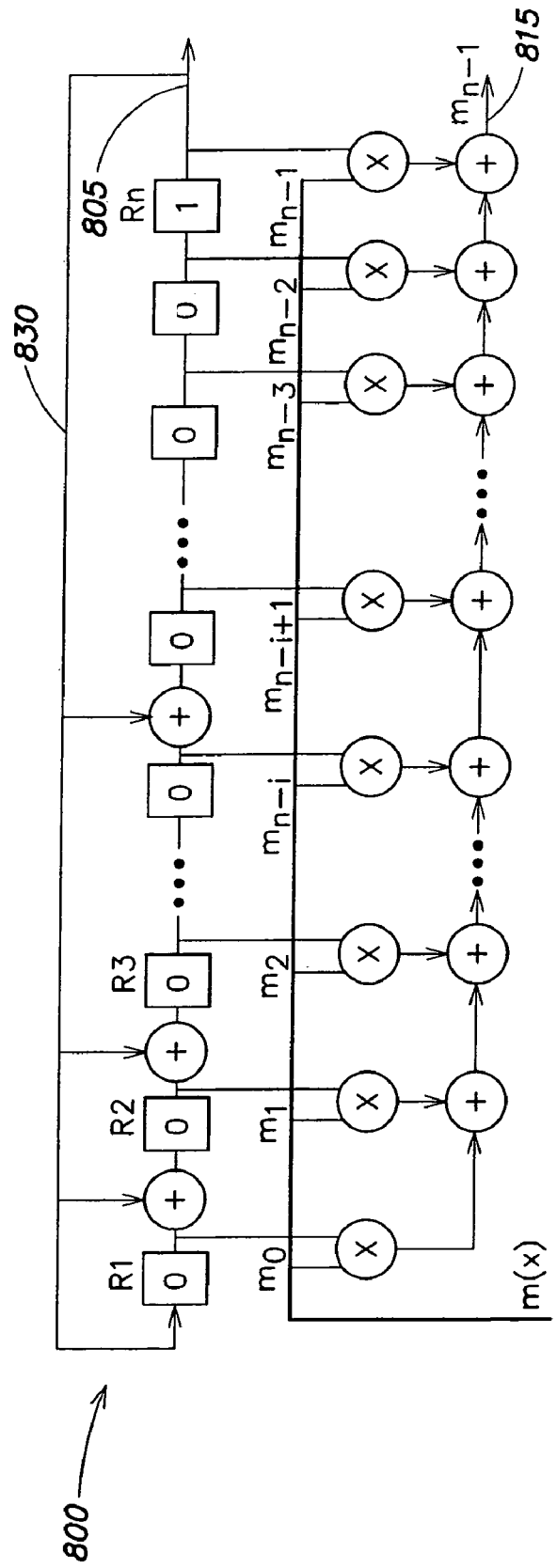
FIG. 8 illustrates an output sequence of a masked LFSR as it shifts from the second special state to the first special state.

FIGS. 8A-8C illustrate a sequence generator 800 in a series of states. In the first state shown in FIG. 8A, LFSR 800 is in special state $g_{n-1}(x)$ since a 1 appears in the leftmost stage R1 and zeroes appear elsewhere. Inspection reveals that masking LFSR 800 with a mask m(x) produces the value of the leftmost bit $m_0$ of mask at output 815. In the next iteration shown in FIG. 8B, the 1 in stage R1 is summed (i.e., XOR'd) with the 0 feedback value at 830 to produce a 1 that is stored in the next stage R2. LFSR now appears in a second state. Masking the LFSR 800 in the second state produces the value of m1 of mask m(x) at output 815.

During each successive iteration, the 1 is shifted into the subsequent stage and the value of the corresponding bit of the mask is produced at output 815. Accordingly, on the $n^{th}$ iteration, the masked LSFR produces at output 815 the value of the final bit $m_{n-1}$ of the mask. Accordingly, a masked LSFR operating from the second special state produces a sequence identical to the mask on the first n iterations.

It should be appreciated that an LFSR implementing a characteristic polynomial performs a division operation between the state vector of the LFSR and the characteristic polynomial. For example, a right shift operation is related to division. In an LFSR, the divisor depends on the feedback connections which are in turn indicated by the characteristic polynomial. Accordingly, the operation of an LFSR may be represented as, $$\frac{g'_k(x)}{p(x)} = s_0 + s_1 x + s_2 x^2 + \ldots + s_{n-2} x^{n-2} + s_{n-1} x^{n-1} + \ldots \quad \text{Equation 8}$$

where $g_k'(x)$ is an arbitrary state of the LFSR and s(x) is the binary sequence generated by the LFSR. Accordingly, since it is known that a mask m(x) is produced by a masked LFSR operating from the second special state $g_{n-1}(x)$ as shown in connection with FIG. 8, the corresponding state of the non-masked LFSR can be obtained by using the relationship in equation 8. In particular, an LFSR operating from state $g_{n-1}'(x)$ may be represented as, $$\frac{g'_{n-1}(x)}{p(x)} = m_0 + m_1 x + m_2 x^2 + \ldots + m_{n-2} x^{n-2} + m_{n-1} x^{n-1} + \ldots \quad \text{Equation 9}$$

Accordingly, $g_{n-1}'(x)$ may be obtained by rearranging Equation 9, that is, $g_{n-1}'(x)$ may be obtained according to, $$g_{n-1}'(x) = \{p(x) \cdot m(x)\}_{degree < n} \quad \text{Equation 10}$$

where the notation $\{\ \}_{degree<n}$ indicates that only terms with order less than n are kept. It should be appreciated that $g_{n-1}(x)$ may be obtained mathematically by multiplying $g_0(x)$ with $x^{n-1}$. Accordingly, $g_{n-1}(x)$ can be interpreted as the result of delaying $g_0(x)$ by n–1 times. Now the goal is to express $g_0(x)$ in terms of $g_{n-1}(x)$ multiplied with a term. Since M-sequences are periodic, $g_0(x)$ may be interpreted as the result of delaying $g_{n-1}(x)$ by $2^n$–n times. It should be appreciated that a delay of $2^n$–n is equivalent to moving forward n–1 times. By employing the shift and add properties of LFSRs, $g_0(x)$ may be expressed in terms of $g_{n-1}(x)$ as, $$g_0(x) = \mod\{g_{n-1}(x) \cdot g_{2^n - n}(x), p(x)\} \quad \text{Equation 11}$$
$$= \mod\{g_{n-1}(x) \cdot g_{-(n-1)}(x), p(x)\}$$

where $g_{2^n-n}(x)$ is the state of an LFSR $2^n$–n iterations subsequent to first special state $g_0(x)$ and $g_{-(n-1)}(x)$ is a state of the LFSR n–1 iterations prior to first special state $g_0(x)$. It should be appreciated that $g_{-(n-1)}(x)$ or $g_{2^n-n}(x)$ may be computed with a computer program or alternatively may be obtained by operating an LFSR implementing a desired characteristic polynomial. State $g_{-(n-1)}(x)$ depends on the characteristic polynomial and not on any mask. Accordingly, $g_{-(n-1)}(x)$ may be computed once and stored for each characteristic polynomial that is implemented and does not factor into the speed of operating the LFSR. Accordingly, equation 11 defines a relationship such that $g_0(x)$ may be obtained from $g_{n-1}(x)$.

It should be appreciated that masking is a linear operation on a linear recursive sequence generator (i.e., an LFSR). Since masked sequences are merely shifted versions of non-masked sequences and the states associated with any given sequence is unique, the relationships between masked states and non-masked states will be the same. In particular, $g_0'(x)$ will have the same relationship with $g_{n-1}'(x)$ as $g_0(x)$ has with $g_{n-1}(x)$. Accordingly, the relationship described in equation 11 can be used to described the relationship between $g_0'(x)$ and $g_{n-1}'(x)$. Specifically, the relationship can be described as, $$g_0'(x) = \mod\{g_{n-1}'(x) \cdot g_{-(n-1)}(x), p(x)\} \quad \text{Equation 12}$$

Since $g_{n-1}'(x)$ may be obtained as shown in equation 10 and $g_{-(n-1)}(x)$ may be pre-computed, $g_0'(x)$ may be determined. Once $g_0'(x)$ has been determined, any arbitrary state vector may be determined by using the relationship of equation 6. As such, an initial state vector associated with an arbitrary mask may be determined such that masking computations are not required.

Figure 9:
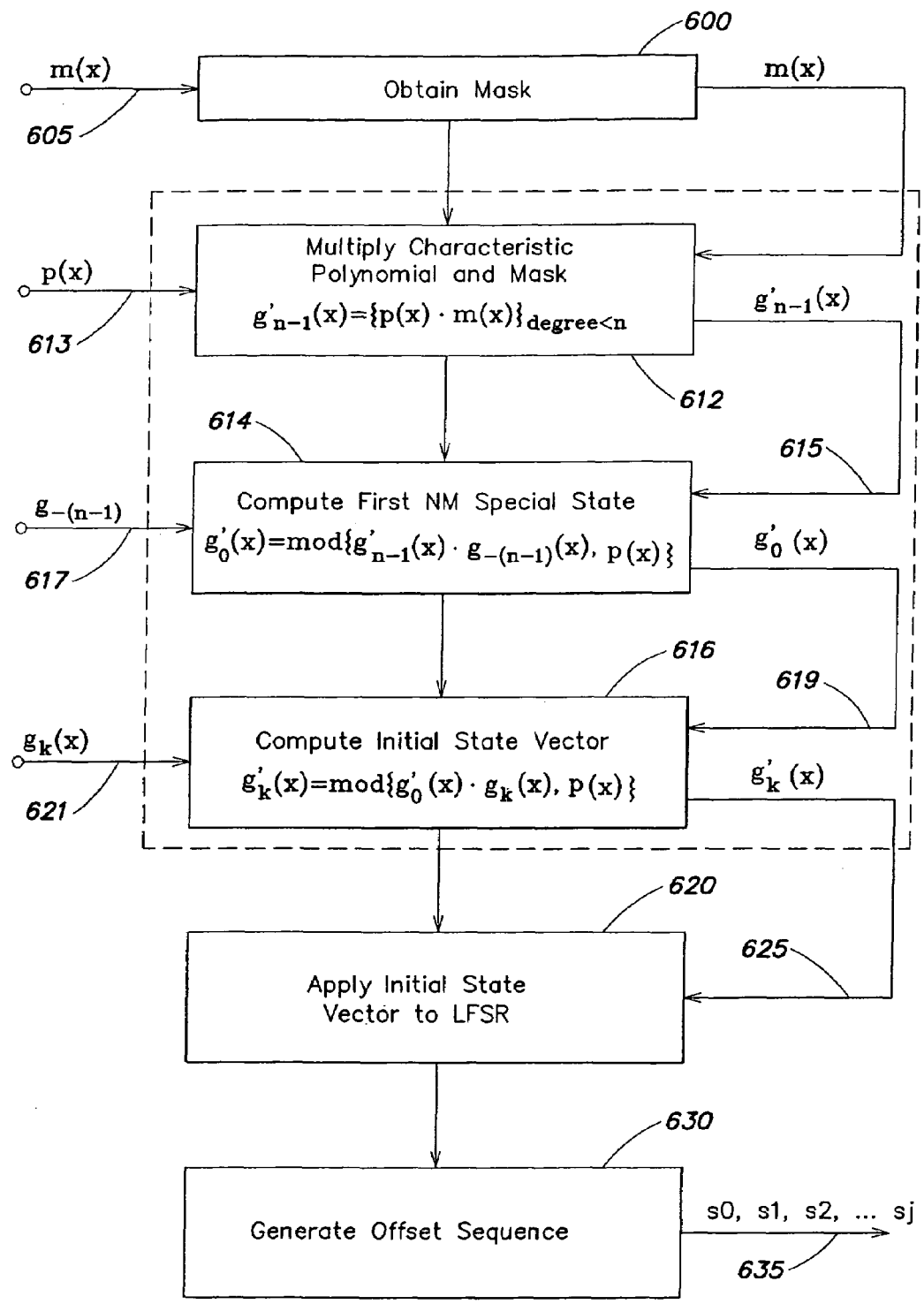
FIG. 9 illustrates another embodiment of a method according to the present invention of generating an offset sequence without masking by determining an initial state vector from a mask.

The foregoing method enables an initial state vector to be computed from a mask, the characteristic polynomial of an LFSR, and a pre-computed state of the LFSR. FIG. 9 illustrates a flow diagram of one embodiment of a method according to the present invention of computing an initial state vector from an arbitrary mask. The initial state vector may then be applied to the LFSR to generate an offset sequence without requiring masking operations.

The method illustrated in FIG. 9 may be similar to that described in connection with FIG. 6. In particular, steps 612-616 describe one embodiment of a method of computing an initial state vector indicated generally at step 610 in FIG. 6. In FIG. 9, the various inputs are given a polynomial representation for clarity. However, it should be appreciated that any representation may used and the representation is not limited to those described herein. The various polynomials shown in FIG. 9 may be stored in any suitable data structure having any representation that permits the representations to be multiplied and/or added together or converted to representations where such operations are permitted. For example, representations of polynomials, state vectors, etc. may be stored as binary numbers.

As in FIG. 6, a mask 605 from which to compute the corresponding initial state vector is obtained in step 600. For example, mask 605 may be an n-bit binary sequence representing the mask polynomial m(x) as defined in equation 3. In step 612, the characteristic polynomial 613 implemented by a sequence generator is multiplied by mask 605. The characteristic polynomial may be represented by a binary sequence describing the feedback connections of an LFSR. Mask 605 and the characteristic polynomial may be multiplied together according to Galois Field mathematics to provide state 615. For example, state 615 may be an n-bit binary number representing $g_{n-1}'(x)$ as discussed above.

In step 614, state 615 may be used to determine non-masked special state 619 of the non-masked sequence generator. As shown, pre-computed state 617, special state 615 and the characteristic polynomial 613 may be used to determine special state 619. For example, special state 619 may be computed as illustrated in step 614 as $$g_0'(x) = \mod\{g_{n-1}'(x) \cdot g_{-(n-1)}(x), p(x)\}.$$

In step 616, special state 619 is used along with a current state 621 of the sequence generator to determine the initial state vector. For example, as described above, various CDMA systems operate according to a reference sequence. Typically, the reference sequence corresponds to an M-sequence that is continually being generated. For example, CDMA2000 defines an M-sequence according to the characteristic polynomial illustrated in FIG. 2A which may be implemented on a 42-bit LFSR as shown in FIG. 2B.

The long code may be continually generated at a given rate and other PN sequence generators may produce a sequence synchronous with the reference sequence by providing a successive bit on each iteration according to the given rate. At each iteration, a state vector may be associated with the generated bit. At some arbitrary time, another bit will be generated having an associated state vector. A current state may therefore be the state vector of an LFSR at a given point in time. It should be appreciated that the value of current state vector 521 may depend on when the LFSR is indexed to obtain its current state.

Accordingly, special state 619, current state 621, and characteristic polynomial 613 may be used to provide the initial state vector associated with mask 605. For example, initial state vector 625 may be obtained by from the above parameters according to $g_k'(x)=\mod\{g_0'(x) \cdot g_k(x), p(x)\}$. The initial state vector 625 may then be applied to an LFSR to generate an offset sequence 635 corresponding to mask 605.

As noted above, some computation is required in order to compute the initial state vector. However, this expense is seen as initialization overhead each time an offset sequence corresponding to a new mask is to be generated. However, the overhead is not a function of the number of bits generated in the offset sequence. Once the initial state vector has been applied to the LFSR, only feedback connections of the LFSR need to be computed.

In contrast, masking requires a set of computations to be executed for each bit of the offset sequence. For example, the masked LFSR illustrated in FIGS. 4A and 4B require an inner product computation between the state vector of the LFSR and the mask for each bit of the offset sequence that is generated. Accordingly, substantial computational savings are made for the non-masked LFSR, particularly when the length of an offset sequence generated is long compared to the frequency at which masks are changed.

Figure 10:
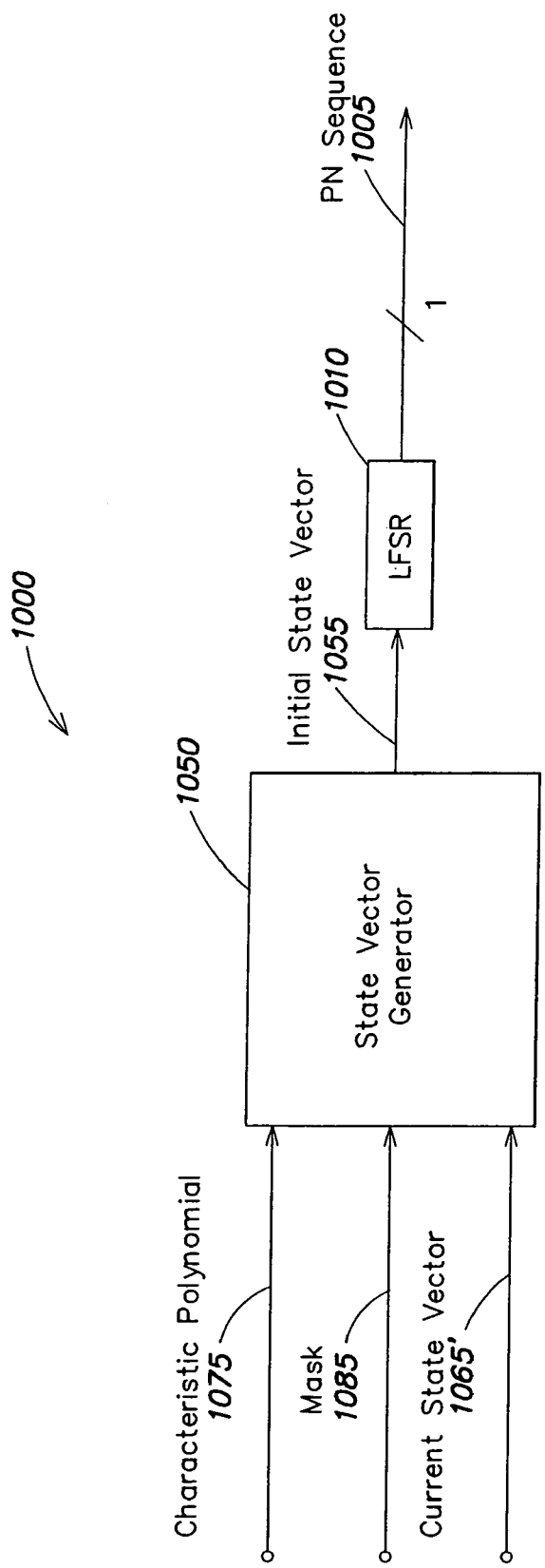
FIG. 10 illustrates a block diagram of one embodiment of a sequence generator according to the present invention having a state vector generator.

However, even though a non-masked LFSR may obviate masking computations, computations related to the feedback connections may still be required in the non-masked LFSR. FIG. 10 illustrates a functional diagram of a non-masked LFSR. For example, sequence generator 1000 may include a non-masked LFSR 1010. Non-masked LFSR 1010 may be implemented in software or hardware. Sequence generator 1000 may further include a state vector generator 1050. State vector generator 1050 may be configured to compute an initial state vector 1055 associated with a mask 1085. State vector generator 1050 may be, for example, a program or set of instructions configured to compute an initial state vector based on a given mask 1085, a characteristic polynomial 1075 implemented by LFSR 1010, and a current state vector 1065' of the LSFR. State vector generator 1050 may provide the generated initial state vector 1055 to LFSR 1010 such that a desired offset PN sequence 1005 is produced.

The current state vector 1065' may be associated with a reference sequence. For example, the reference sequence may be simultaneously generated by each of various transceivers in a communication system. It should be appreciated that current state vector 1065' may obtained either from non-masked LFSR 1010 at a time when it is generating the reference sequence or may be obtained from a separate LFSR (not shown). In particular, a sequence generator may have a first LFSR to generate the reference sequence and a second LFSR to generate an offset sequence of the reference sequence, or both sequences may be generated by the same LFSR.

Once the initial state vector has been applied to the LFSR, each bit requires computing the various the feedback connections of the LFSR. For example, each time the feedback connections are computed (i.e., each time LFSR 1010 is effectively shifted) a single bit is produced at output 1005. For LFSR implementations in software, these computations may be relatively expensive. For example, computations include an XOR operation for each feedback connection required by the characteristic polynomial. In addition, the state of the LFSR must be updated for the next iteration, and other computations may need to be performed for each bit generated on each iteration.

Applicant has appreciated that properties of a characteristic polynomial of an LFSR may be exploited to simultaneously generate multiple bits of a binary sequence. That is, the arrangement of feedback connections may yield multiple bits of a binary sequence simultaneously.

Figure 11A:
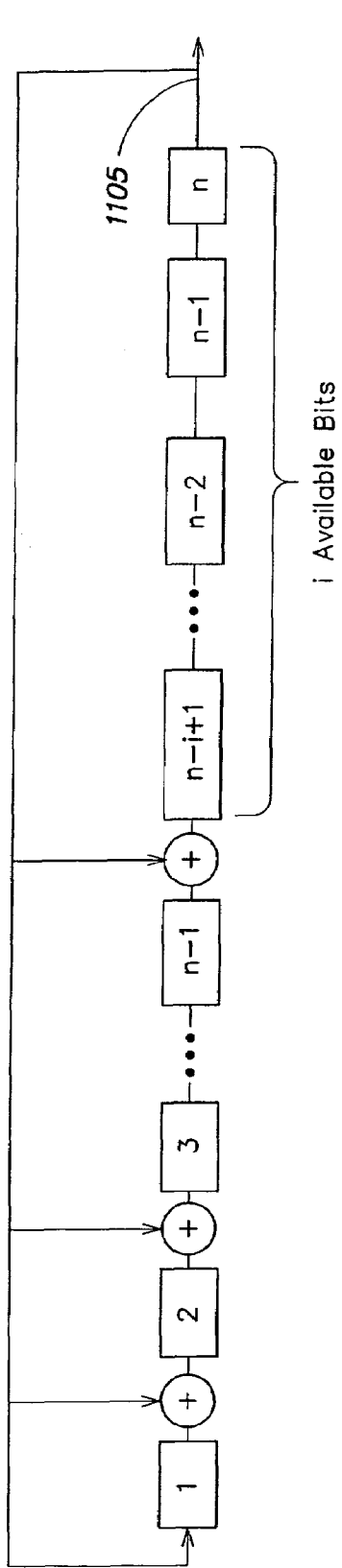
FIG. 11A illustrates the concept that multiple bits may be simultaneously available in an LFSR according to the present invention.
Figure 11B:
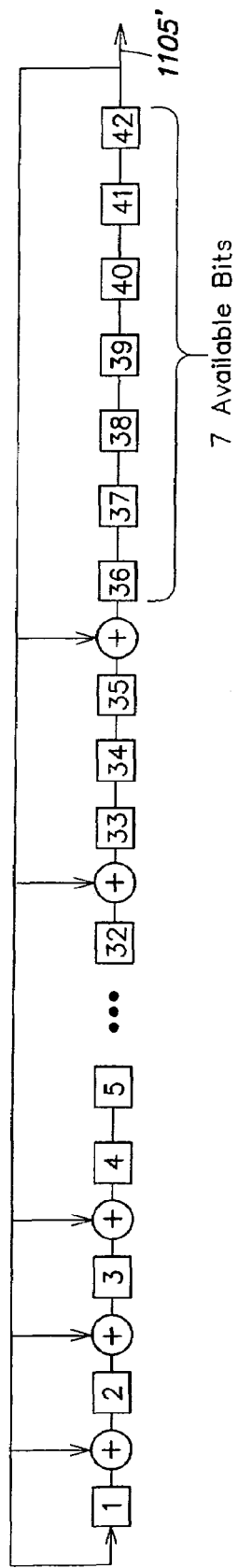
FIG. 11B illustrates that 7 bits may be simultaneously available in an LFSR implementing the characteristic polynomial defined in CDMA2000 according to the present invention.

In particular, Applicant has recognized that multiple bits may be output simultaneously where the number of simultaneous bits is related to a difference in order between the highest order non-zero term and the second highest order non-zero term. This order difference yields a series of stages of the LFSR having no feedback connections. The absence of feedback connections allows corresponding bits of the LFSR to be output simultaneously. FIGS. 11A and 11B illustrate this concept.

FIG. 11A illustrates an n-bit LFSR having feedback connections as required by a characteristic polynomial (not shown). The i highest order stages of the LFSR have no feedback connections between them. That is, the characteristic polynomial has zero coefficients for the $x^{n-1}$-$x^{(n-i+1)}$ terms. As a result, the i values stored in the corresponding stages do not change as they shift toward the output 1105 and may be available simultaneously and considered as an i-bit sequence. For example, FIG. 11B illustrates a LFSR implementing the characteristic polynomial established by CDMA2000. In this arrangement, seven bits may be made available simultaneously.

However, the availability of multiple bits may not be useful if only a single new bit is generated for each iteration, that is, if the LFSR is shifted by a single bit on each iteration. Accordingly, Applicant has developed a method of computing i shifts of an LFSR. In particular, Applicant has recognized that an LFSR may be effectively shifted i times by computing a state of the LFSR advanced from a current state by i states. Provided that the $i^{th}$ next state can be computed, i bits may be available on each iteration without having to shift (and compute feedback connections) i separate times. Instead, an LFSR may be advanced to the computed state and another i bits may be provided.

Figure 12:
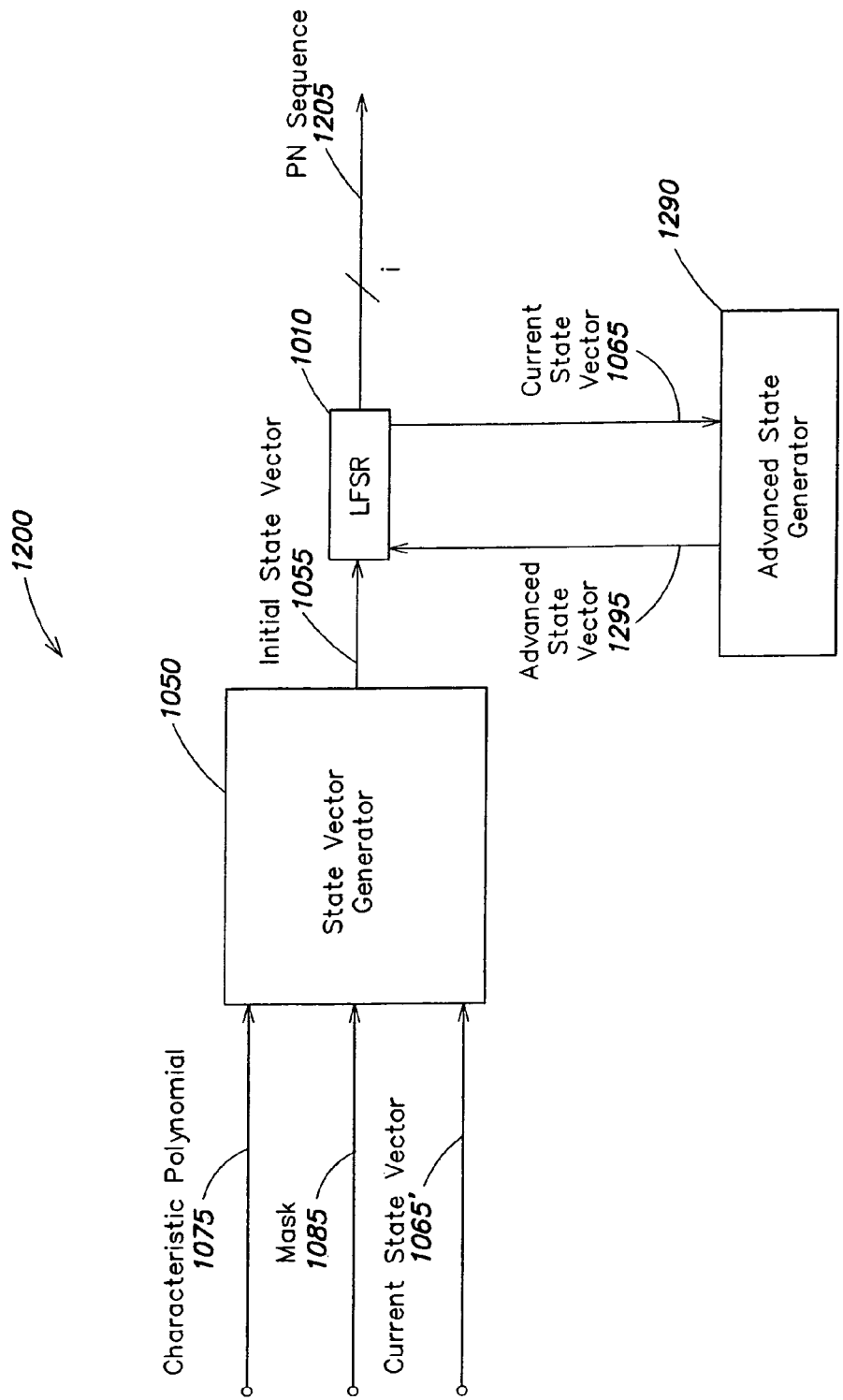
FIG. 12 illustrates one embodiment of a sequence generator according to the present invention having an advanced state vector generator.

FIG. 12 illustrates one embodiment of a sequence generator according to the present invention. Sequence generator 1200 may be similar to the sequence generator described in connection with FIG. 10. However, sequence generator 1200 may include an advanced state generator 1290. As described in connection with FIGS. 11A and 11B, a number of bits i may be simultaneously output from an LFSR where i may be equal to the difference between the order of an associated characteristic polynomial and the order of the next highest order non-zero term.

However, in order to take advantage of this property, an LFSR must be advanced i states without having to iterate i times. The term "advance" refers generally to moving a state of a sequence generator from a first state to a subsequent state without transitioning through intervening states.

Advanced state generator 1290 may be coupled to LFSR 1010 such that it may provide LFSR 1010 with a desired state and such that it can obtain a current state of LFSR 1010. At some point in time, the most significant i bits of a current state vector may be simultaneously provided as PN sequence 1205. It should be appreciated that current state vector 1065 is associated with an offset sequence and current state vector 1065' is associated with a reference sequence.

Advanced state generator 1290 may then compute a subsequent or next state vector offset from the current state vector by i iterations. Advanced state generator 1290 may then apply the computed subsequent state vector to LFSR 1010. As a result, i bits may be computed for each iteration of sequence generator 1200.

Sequence generator 1200 may be advantageously implemented in software. For example, in some embodiments according to the present invention, a PN sequence may be generated by computing a new state vector offset from a current state vector by a desired offset (e.g., offset by i states of the LFSR), providing i-bits of the new state vector and iterating.

Figure 13:
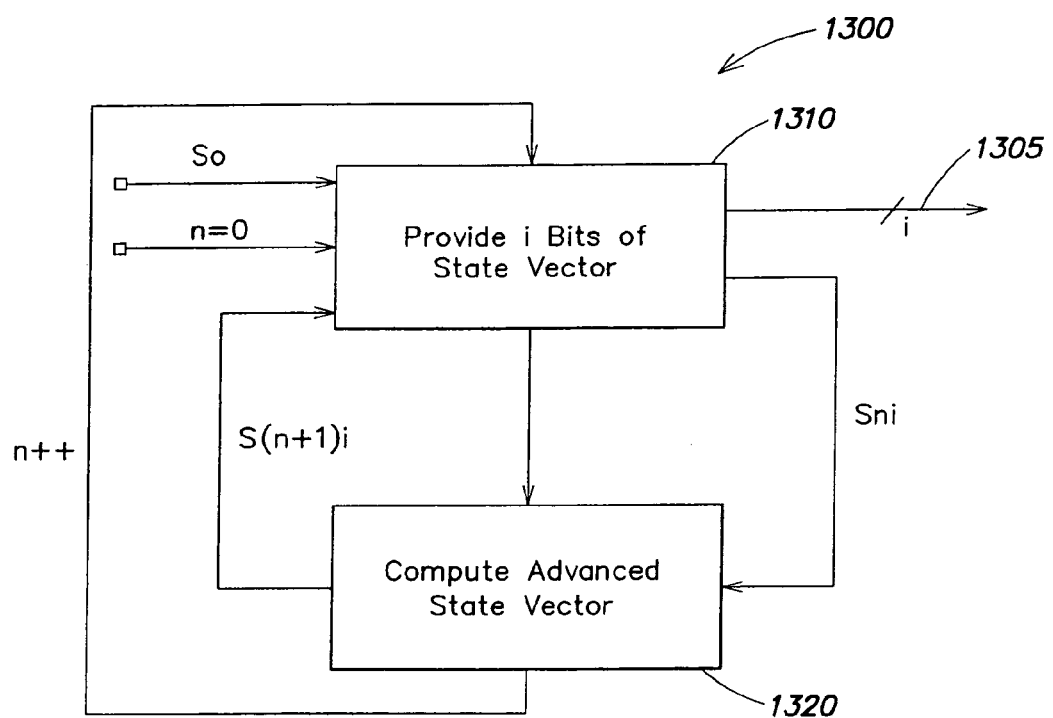
FIG. 13 illustrates one embodiment of a method according to the present invention for advancing the state of a sequence generator by multiple states.

FIG. 13 illustrates one embodiment of a method of generating an offset sequence by iteratively advancing the state of a sequence generator by a desired offset. Method 1300 may be used, for example, in a software implementation of a sequence generator having a plurality of states. The sequence generator may include a plurality of feedback connections arranged to produce a desired base sequence associated with a characteristic polynomial. In each state, the sequence generator may provide a bit of the base sequence at a unique phase. Accordingly, when the plurality of states are transitioned through in an order defined by the feedback connections, the base sequence may be generated.

In method 1300, a base sequence may be generated without having to iterate through each of the plurality of states of the sequence generator. In particular, at a time $t_0$, the sequence generator may be in a state $s_0$. In one embodiment, the state so is provided by computing the initial state vector associated with a given mask for generating an offset sequence. Alternatively, state so may be any arbitrary one of the plurality of states of the sequence generator.

In step 1310, a plurality of bits of the base sequence at a phase defined by state so are generated. For example, the characteristic polynomial implemented by the sequence generator may be an nth-order polynomial having a second highest non-zero term with an order of n–i. Accordingly, i bits of the reference sequence may be obtained simultaneously by providing the values from the i highest order stages of the sequence generator. The i-bit sequence may be provided at output 1305.

In step 1320, the state of the sequence generator may be advanced by i states. For example, if the sequence generator were conventionally iterated i times (i.e., by computing feedback connections), the sequence generator would be in a state $s_i$. In step 1320, state $s_i$ may be directly computed, thus obviating the need to iterate (and to perform shift computations) through the intervening states $s_1$-$s_{i-1}$.

This process (i.e., steps 1310 and 1320) may be repeated as many times as desired such that i bits of a base sequence at a desired phase (i.e, a phase determined by state $s_0$) may be simultaneously generated. In particular, during each iteration, the state of the sequence generator is advanced i states by computing a state $s_{(ni)}$ where n is the loop index. State $s_{(ni)}$ may then be applied to the generator to simultaneously provide a subsequent i bits of the base sequence.

Applicant has recognized and developed methods of advancing the state of a sequence generator. Since stages of a sequence generator without feedback connections are associated with zero terms of the corresponding characteristic polynomial, the characteristic polynomial of a sequence generator (e.g., an LFSR) may be expressed as, $$p(x)=x^n+x^{n-i}+p_{i+1}x^{n-(i+1)}+\ldots+p_{n-2}x^2+p_{n-1}x^1+1 \quad \text{Equation 13}$$

By defining a truncated polynomial as, $$q(x)=x^{n-i}+p_{i+1}x^{n-(i+1)}+\ldots+p_{n-2}x^2+p_{n-1}x^1+1 \quad \text{Equation 14}$$

characteristic polynomial p(x) may be expressed as, $$p(x)=x^n+q(x) \quad \text{Equation 15}$$

As discussed above, the current state of an LFSR may be described as, $$g_k(x)=r_n(k)+r_{n-1}(k)x+r_{n-2}(k)x^2+\ldots+r_2(k)x^{n-2}+r_1(k)x^{n-1} \quad \text{Equation 2}$$

A first partial state vector having the first i stages of state $g_k(x)$ may be expressed as, $$u_k(x)=r_n(k)+r_{n-1}(k)x+\ldots+r_{n-i+2}(k)x^{i-2}+r_{n-i+1}(k)x^{i-1} \quad \text{Equation 16}$$

A second partial state vector having the first n–i stages of $g_k(x)$ may be expressed as, $$v_k(x)=r_{n-i}(k)+r_{n-i-1}(k)x+\ldots+r_2(k)x^{n-i-2}+r_1(k)x^{n-i-1} \quad \text{Equation 17}$$

It can be shown that by employing various properties of characteristic polynomial p(x) (including shift-and-add properties), that a new state advanced from $g_k(x)$ by i states may be obtained from the relationship, $$g_{k+i}(x)=v_k(x)+u_k(x)\cdot q(x) \quad \text{Equation 19}$$

Figure 14:
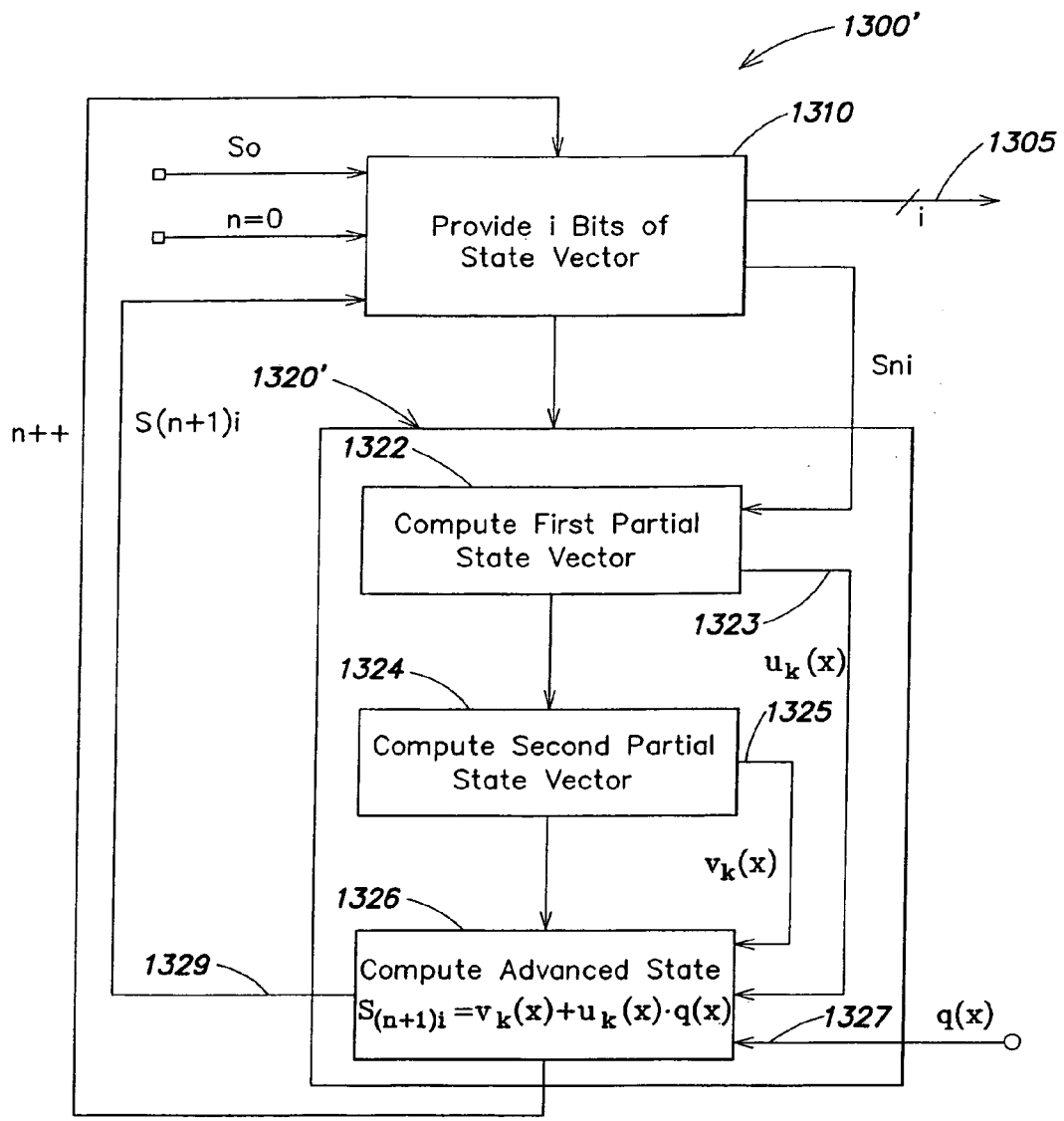
FIG. 14 illustrates another embodiment of a method according to the present invention for advancing the state of a sequence generator by multiple states.

Accordingly, a sequence generator may be advanced by i states, where i may be determined by an order difference between the highest order non-zero term and the second highest order non-zero term of the characteristic polynomial. FIG. 14 illustrates one embodiment of a method according to the present invention for generating multiple simultaneous bits of a base sequence. Method 1300' may be similar to the method described in connection with FIG. 13. However, step 1320' (including steps 1322-1326) describes details of one embodiment of advancing the state of a sequence generator that may be performed during step 1320 in FIG. 13.

In step 1322, a first partial state vector may be computed from the current state vector $S_{ni}$. For example, the first partial state vector may be computed according to the relationship expressed in equation 16, and a representation of $u_k(x)$ may be provided at output 1323. In step 1324, a second partial state vector may be computed from the current state vector $S_{ni}$. For example, the second partial state vector may be computed according to the relationship expressed in equation 17, and a representation of $v_k(x)$ may be provided at output 1325.

In step 1326, advanced state $S_{(n+1)i}$ may be computed from the first and second partial state vectors and a truncated characteristic polynomial associated with the characteristic polynomial of the sequence generator. For example, truncated polynomial may be a representation of q(x) expressed in equation 13 and provided at input 1327. Advanced state $S_{(n+1)i}$ may then be computed, for example, according to the relationship expressed in equation 19. The resulting advanced state $S_{(n+1)i}$ may be provided at output 1329. The advanced state may be applied to the sequence generator such that a subsequent i bits of a base sequence may be produced at output 1305 as described in connection with FIG. 13.

The representations of the first and second partial state vectors, truncated polynomial and advanced state may be, for example, binary numbers or other representations that permit the representations to be operated on. FIG. 14 illustrates one method of computing an advanced state of a sequence generator. However, any method capable of advancing the state of sequence generator may be used without departing from the scope of the invention.

It should be appreciated that an increase in computation speed according to the method described above may depend on the characteristic polynomial of the sequence generator. For example, the speed increase may be directly related to the number of end stages of an LFSR that do not have feedback connections. That is, the speed increase may depend on the value of i, which depends on the order difference of the characteristic polynomial, for example, as illustrated in FIG. 11A.

Applicant has appreciated that a characteristic polynomial associated with a sequence generator may be converted, or reshaped into a polynomial of a higher order, referred to herein as an expanded characteristic polynomial. The expanded characteristic polynomial may have an increased order difference such that a sequence generator implementing the expanded characteristic polynomial may have no feedback connections for a desired number of the highest order stages. Accordingly, polynomial reshaping may provide a sequence generator capable of generating any number of bits simultaneously.

As discussed above, an order difference refers to a difference between the highest order non-zero term (i.e., the term having an order equal to the order of the polynomial) and the second highest order non-zero term. The order difference of a characteristic polynomial may be increased by expanding the characteristic polynomial, also referred to herein as polynomial reshaping.

Figure 15:
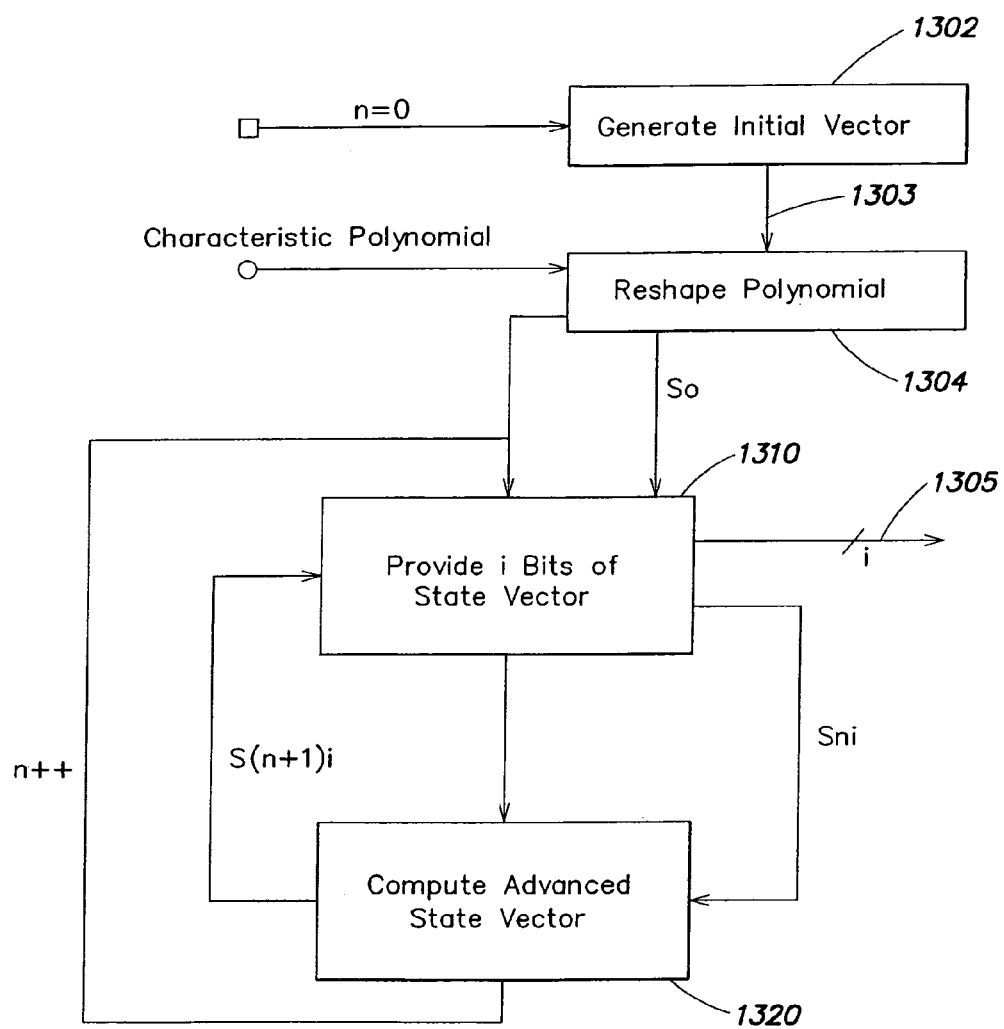
FIG. 15 illustrates one embodiment of a method according to the present invention for reshaping the characteristic polynomial of a sequence generator.

FIG. 15 illustrates an embodiment according to the present invention of a method of reshaping the characteristic polynomial of a sequence generator to provide a desired order difference. The method may be used in a sequence generator adapted to provide multiple bits of a sequence simultaneously. For example, polynomial reshaping may be used in connection with the method described in connection with FIG. 13 and/or FIG. 14. In particular, steps 1310 and 1320 may be similar to those described in FIG. 13.

However, before the sequence generator begins providing a sequence, the characteristic polynomial may be expanded such that an increased number of bits may be produced simultaneously. In step 1302, a state vector 1303 may be introduced. This state vector may be generated as an initial state vector associated with a particular mask, may be a current state of the sequence generator, or may be an arbitrary state vector associated with a sequence at a desired offset.

In step 1304, the characteristic polynomial may be expanded. For example, the order difference of the characteristic polynomial may be insufficient to generate a desired number of simultaneous bits of a base sequence. Accordingly, a state vector corresponding to state vector 1303 and associated with an expanded characteristic polynomial may be generated. This state vector (e.g., state vector so) may be applied to provide i bits of an offset sequence.

Applicant has developed a number of methods of reshaping a polynomial, such that a desired order difference in an expanded characteristic polynomial may be achieved, and determining an associated state vector having a desired number of bits available simultaneously.

One method of polynomial reshaping includes coarse polynomial reshaping. Coarse polynomial reshaping may be advantageous in circumstances when relatively large increases in an order difference of a characteristic polynomial are desired. Equation 13 expresses a characteristic polynomial $p(x)$ having an order difference of i. Equation 14 expresses a truncated polynomial $q(x)$ equal to the characteristic polynomial $p(x)$ without the highest order term as shown in the relationship expressed in equation 15. Accordingly, the difference in the order of polynomial $p(x)$ and polynomial $q(x)$ is equal to i. By considering the relationship in equation 15, the square of characteristic polynomial $p(x)$ may be expressed as, $$[p(x)]^2 = [x^n + q(x)]^2 \qquad \text{Equation 20}$$
$$= x^{2n} + x^n \cdot q(x) + x^n \cdot q(x) + [q(x)]^2$$
$$= x^{2n} + [q(x)]^2$$

That is, squaring characteristic polynomial $p(x)$ provided an expanded characteristic polynomial, $$p'(x) = x^{2n} + [q(x)]^2 \qquad \text{Equation 21}$$

Expanding $[q(x)]^2$ yields, $$[q(x)]^2 = x^{2(n-i)} + p_{i+1} x^{2[n-(i+1)]} + \ldots + p_{n-2} x^4 + p_{n-1} x^2 + 1 \qquad \text{Equation 22}$$

Accordingly, the expanded characteristic polynomial may be expressed as, $$p'(x) = x^{2n} + x^{2(n-i)} + p_{i+1} x^{2[n-(i+1)]} + \ldots + p_{n-2} x^4 + p_{n-1} x^2 + 1 \qquad \text{Equation 23}$$

The order difference of the expanded characteristic polynomial $p'(x)$ is twice the order difference of characteristic polynomial $p(x)$. Accordingly, the square operation may double the order difference of a characteristic polynomial. Once an expanded characteristic polynomial has been determined, the state vector of a sequence generator must also be updated. That is, a state vector associated with an expanded characteristic polynomial and corresponding to the same state vector associated with the characteristic polynomial may need to be determined. The output of a sequence generator implementing a characteristic polynomial is expressed in equation 8. Multiplying the numerator and denominator by the characteristic polynomial yields, $$\frac{g_k'(x)}{p(x)} = \frac{g_k'(x) \cdot p(x)}{[p(x)]^2} \qquad \text{Equation 24}$$

This relationship illustrates that the output of a sequence generator implementing the expanded characteristic polynomial may be generated by multiplying the state vector $g_k'(x)$ by the characteristic polynomial. That is, a state vector associated with the expanded characteristic polynomial may be determined from the state vector associated with the characteristic polynomial by the relationship, $$g_k''(x) = g_k'(x) \cdot p(x) \qquad \text{Equation 25}$$

where $g_k''(x)$ is the state vector associated with the expanded characteristic polynomial $p'(x)$. Accordingly, an order difference of a characteristic polynomial may be doubled and the associated state vector determined. For example, in step 1304 in FIG. 15, a characteristic polynomial of a sequence generator may be squared to provide an expanded characteristic polynomial. State vector so may be determined by multiplying the characteristic polynomial by state vector 1303 provided in step 1302. As a result of the feedback connections associated with the expanded characteristic polynomial, i bits from state vector $s_0$ may be simultaneously be provided at output 1405, where i is twice the order difference of the characteristic polynomial. This process may be repeated until a desired order difference is achieved.

Another method of polynomial reshaping includes fine polynomial reshaping. Fine polynomial reshaping may be used to increase an order difference by smaller increments than may be achieved using coarse polynomial reshaping. For example, it may desirable to provide an order difference that is a multiple of 8 such that the number of bits simultaneously output by a sequence generated may be matched to a width of the data bus of a DSP or CPU, for example. However, depending on the characteristic polynomial, such a multiple may not be able to be achieved using coarse polynomial reshaping alone.

Rather than doubling the order difference on each application (as with coarse polynomial reshaping), fine polynomial reshaping may increase an order difference by i, where i is the order difference of the characteristic polynomial. As such, coarse polynomial reshaping may increase an order difference geometrically while fine polynomial reshaping may increase an order difference arithmetically upon each application. In one embodiment of fine polynomial reshaping, multiplying a characteristic polynomial by an operator $(1+x^i)$ yields an expanded characteristic polynomial, $$(1+x^i)p(x) = x^n + x^{n-i} + p_{i+1}x^{n-(i+1)} + \ldots + p_{n-2}x^2 +$$

$$p_{n-1}x^1 + 1 + x^{n+i} + x^n + p_{i+1}x^{n-1} + \ldots +$$

$$p_{n-2}x^{2+i} + p_{n-1}x^{1+i} + x^i$$

$$= x^{n+i} + p_{i+1}x^{n-1} + \ldots + (1+p_{2i})x^{n-i} + \ldots +$$

$$(1+p_{n-i})x^i + \ldots + p_{n-1}x^1 + 1$$

Equation 26

As shown, the order difference is increased by the value of 1. By the relationship discussed in connection with equation 24, $$\frac{g'_k(x)}{p(x)} = \frac{g'_k(x) \cdot (1+x^i)}{p(x) \cdot (1+x^i)}$$

Equation 27 and the state vector associated with the expanded polynomial may be obtained from, $$g_k''(x) = (1+x^i) \cdot g_k'(x)$$

Equation 28

It should be appreciated that repeated application of coarse and fine polynomial reshaping yields various increases in the order difference depending on the combination and number of applications. Accordingly, the two polynomial reshaping methods may be used in connection with one another and in any combination to produce a desired increase in an order difference of a characteristic polynomial.

Another method of polynomial reshaping includes one-step polynomial reshaping. This method may be particularly useful when a highest desired order of an expanded polynomial is known. For example, it may be advantageous to match the order of the expanded characteristic polynomial to the word length of a DSP or other processor operating in conjunction with the sequence generator to accommodate the increased length of the sequence generator (i.e., the increased length of the expanded state vectors associated with the expanded characteristic polynomial).

For example, the order of a characteristic polynomial may be expanded to 32 or 64 bits to align with the word length of an associated processor or microcomputer architecture. In one step polynomial reshaping, an expanded characteristic polynomial may be expressed as, $$p'(x) = x^l + \mathrm{mod}(x^l, p(x))$$

Equation 29 where l is the order of the expanded characteristic polynomial and the length of the expanded state vectors. Accordingly, the expanded state vector associated with the expanded characteristic polynomial may be obtained from, $$g_k''(x) = g_k'(x) \cdot \frac{p'(x)}{p(x)}$$

Equation 30

One-step polynomial reshaping provides an expanded characteristic polynomial having an order difference equal to i=l−n+1, where n is the order of the characteristic polynomial and, as discussed above, l is the order of the expanded characteristic polynomial.

Coarse, fine and one-step polynomial shaping may be used individually or in any combination to provide a desired order difference. Accordingly, the number of bits of a sequence that may be simultaneously provided on each iteration may be adjusted, for example, to achieve a desired speed increase in generating a PN sequence.

In each of coarse, fine and one-step polynomial the state vector associated with the characteristic polynomial is multiplied by an operator associated with the expanded characteristic polynomial. Such expansion operators as discussed above may be used to increase the order difference of a characteristic polynomial. However, there may be various other expansion operators suitable for increasing the order difference of a characteristic polynomial, which are considered to be within the scope of the present invention.

Figure 16:
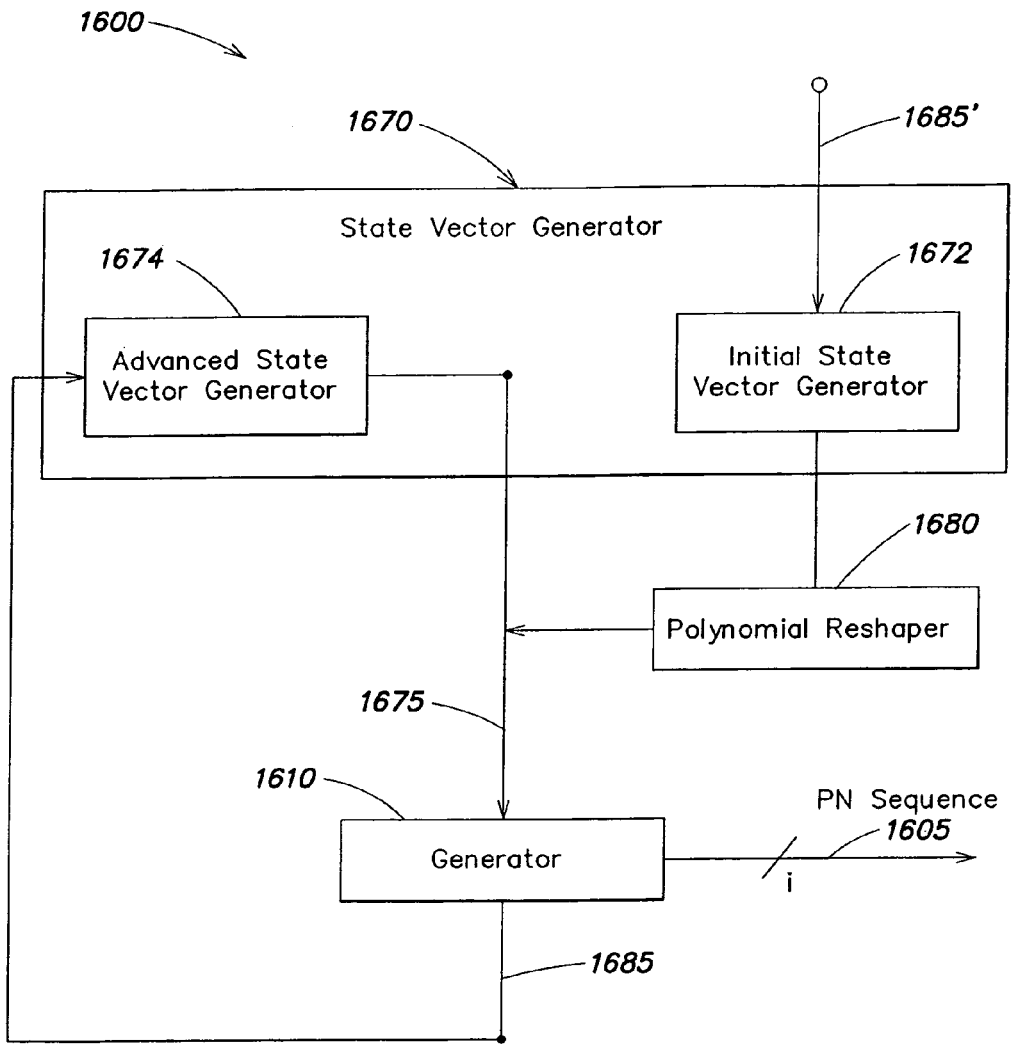
FIG. 16 illustrates one embodiment of a sequence generator incorporating various aspects of the present invention.

It should be appreciated that various concepts described herein may implemented alone or in combination with other aspects of the present invention. For example, FIG. 16 illustrates one embodiment of an apparatus for generating PN sequence incorporating various aspects of the present invention. An apparatus indicated generally by 1600 may be configured such that, when operating, it generates a base sequence provided at 1605. For example, apparatus 1600 may implement one or more characteristic polynomials associated with various respective M-sequences.

Apparatus 1600 may include a state vector generator 1670 for computing various desired state vectors that may be applied to generator 1610. For example, state vector generator 1670 may include an initial state vector 1672 and an advanced state vector generator 1674. Initial state vector generator 1672 may be adapted to compute an initial state vector from a mask such that when the initial state vector is applied to generator 1610, an offset sequence at a desired phase of the base sequence is provided at output 1605. For example, initial state vector 1685' associated with a reference sequence may be provided to initial state vector generator 1672. As discussed above, initial state vector 1685' may be provided by generator 1610 or may be provided by another generator (not shown) that generates the reference sequence.

Advanced state vector generator 1674 may be adapted to compute a next state vector advanced from a current state of generator 1610 by a desired number of states. For example, i bits of a current state vector 1685 associated with an offset sequence may be provided simultaneously at output 1605. Advanced state vector generator 1674 may then compute a state vector advanced from the current state vector by i states. This advanced state vector may then be provided to generator 1610 such that another i bits may be simultaneously provided at output 1605. That is, advanced state vector may update the current state vector with the advanced state vector.

Apparatus 1600 may also include polynomial reshaper 1680. Polynomial reshaper 1680 may be employed to expand the characteristic polynomial of the apparatus. Accordingly, polynomial reshaper may compute an expanded state vector associated with the expanded characteristic polynomial. The expanded state vector may be configured such that when applied to generator 1610, i bits may be provided simultaneously at output 1605. Polynomial reshaper may employ coarse, fine, one-step polynomial reshaping or another method capable of increasing an order difference of the characteristic polynomial. The choice and number of applications of the various reshaping techniques may depend on the characteristic polynomial being implemented and on a desired increase in order difference.

It should be appreciated that apparatus 1600 may be implemented in hardware, software or a combination of both. Apparatus 1600 may be employed in a CDMA environment where multiple offset sequences may be produced. For example, in the environment of FIG. 3, apparatus 1600 may need to rapidly change the PN sequence generated at output 1605, for example, to match the PN sequence of one of the plurality of transceivers.

Figure 17:
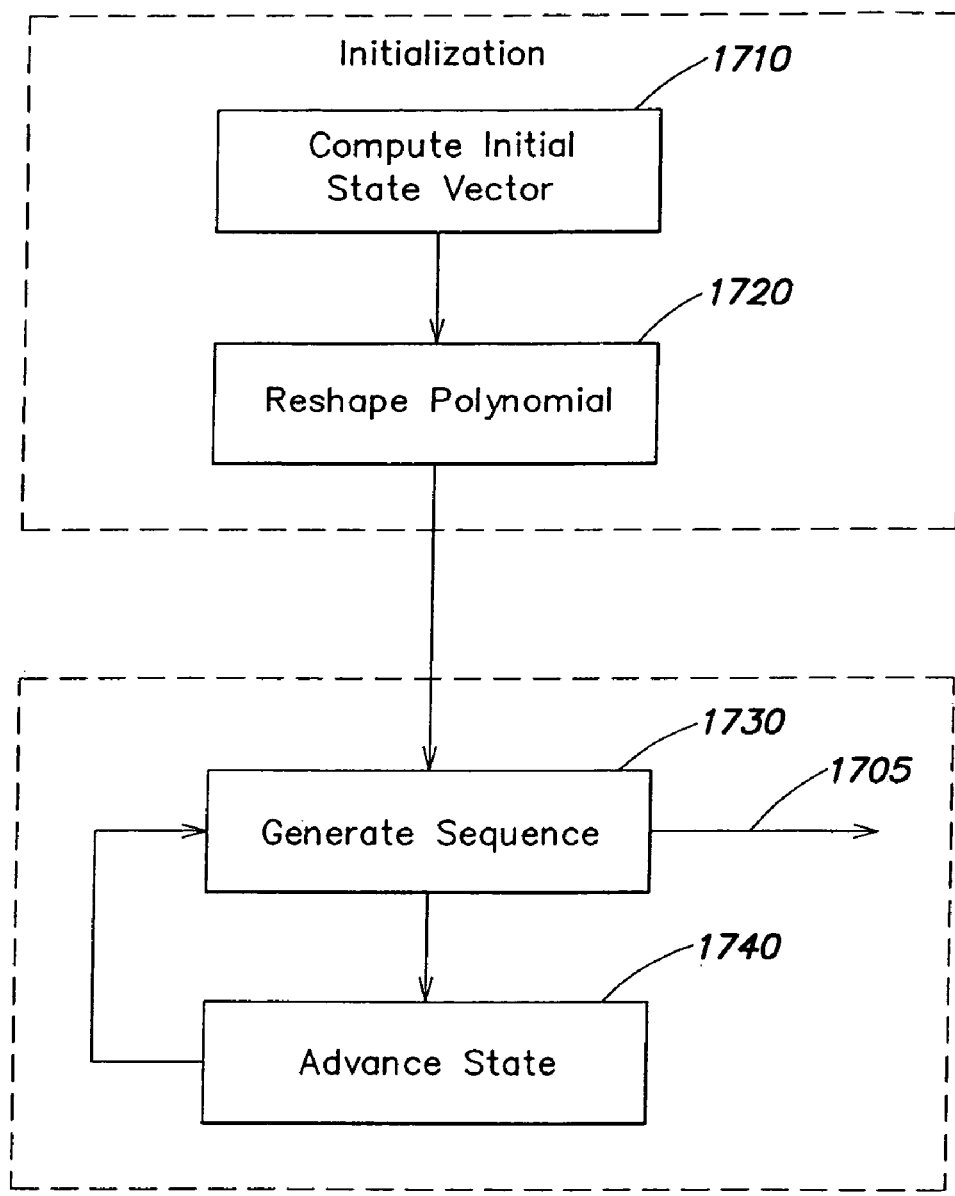
FIG. 17 illustrates one embodiment of a method for generating an offset sequence incorporating various aspects of the present invention.

FIG. 17 illustrates one embodiment of a method of generating desired offset sequences according to the present invention. For example, at a point in time a different offset sequence than the one currently being generated may be desired. For example, a base station may change an offset sequence being generated to match the sequence used by a transceiver to modulate a transmitted signal. The offset sequence may be associated with a unique mask assigned to the transceiver.

In step 1710, an initial state vector associated with the mask may be determined. The initial state vector may be such that the offset sequence corresponding to the mask can be generated without having to mask the state of the sequence generator. That is, the initial state vector may be the state of a sequence generator corresponding to a phase of the base sequence described by the mask, that is, that would be produced via masking computations.

In step 1720, the characteristic polynomial may be reshaped in order to increase its order difference. For example, the order difference of the characteristic polynomial may be considered to determine how much of an increase is desired. For example, it may be desirable to obtain an order difference that is a multiple of 8. Accordingly, the order difference of the characteristic polynomial may be compared with the nearest multiple of 8, compared with the bus width that the sequence generator is connected to, or any desired order difference. A desired increase in order difference may be ascertained and an appropriate number and combination of coarse, fine and/or one-step polynomial shaping operations may be applied.

In particular, in step 1720, the initial state vector computed in step 1710 may be converted into an expanded state vector having an increased number of bits of an offset sequence that may be available simultaneously. In step 1730, the expanded state vector may be applied and a portion of the offset sequence may be generated. For example, a number of bits equal to an order difference of the expanded characteristic polynomial computed in step 1720 may be provided at output 1705.

In step 1740, a state vector advanced from a current state vector by the number of bits provided in the step 1730 may be computed. The advanced state may be applied to the sequence generator as a new current state. This process may be repeated such that multiple bits of the offset sequence may be generated on each iteration. For example, step 1730 may be repeated after step 1740 for a desired number of iterations.

It should be appreciated that steps 1710 and 1720 need only be performed when it is desired to generate a different offset sequence and do not therefore affect the speed of generating an offset sequence once initialization has occurred. The method described above may be used to quickly generate one of various offset sequences associated with a plurality of transceivers.

Figure 18:
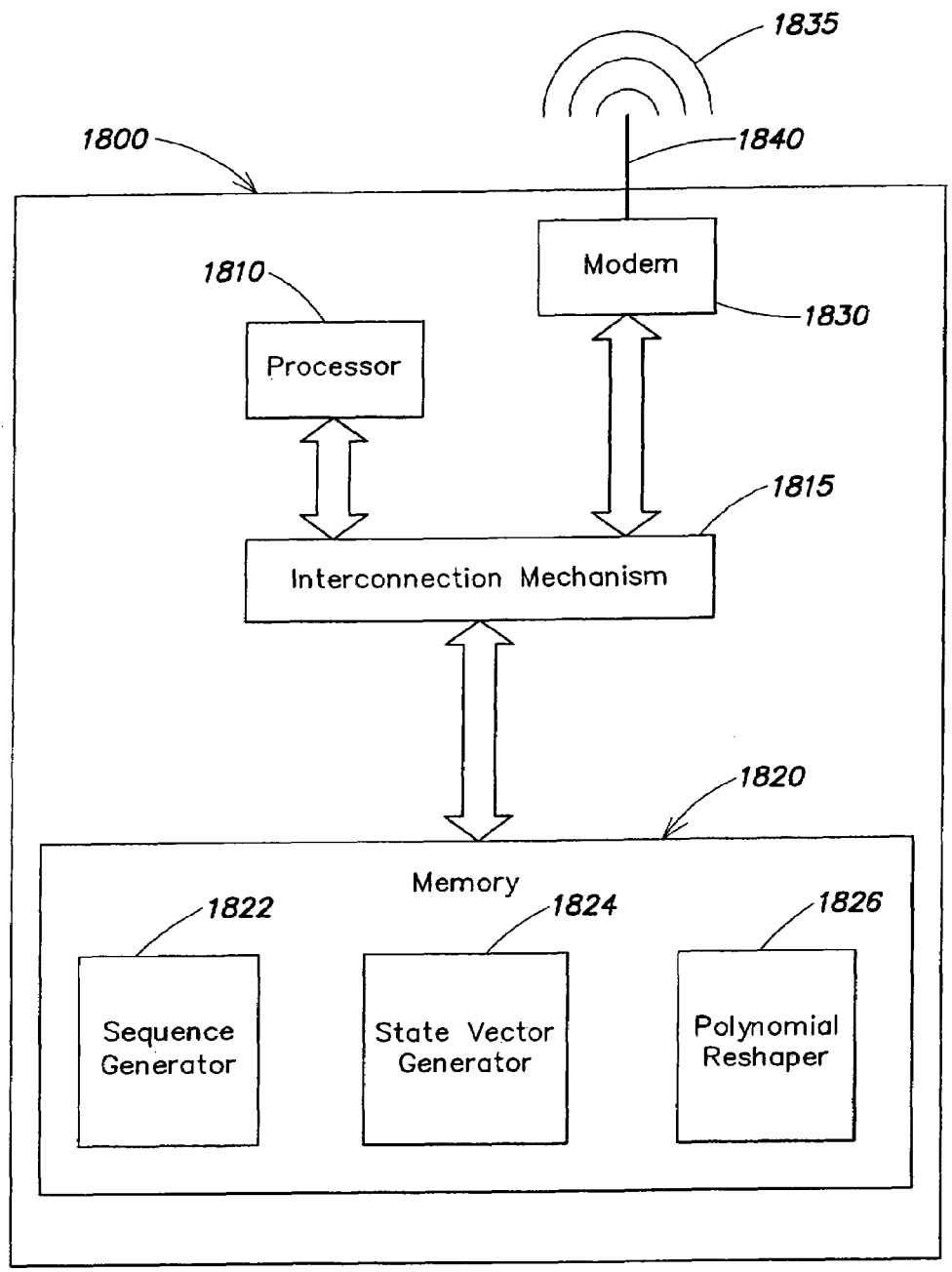
FIG. 18 illustrates one embodiment of a transceiver according to the present invention having a PN sequence generator implemented in software.

FIG. 18 illustrates one embodiment of a transceiver implementing various aspects of the present invention. Transceiver 1800 includes a processor 1810 connected to one or more memory devices including memory 520 via interconnection mechanism 1815. Processor 1810 may be any of various processors capable of logic and arithmetic computations, executing instructions and/or handling various signal processing tasks. Processor 1810 may be a digital signal processor (DSP) using any of various suitable architectures. For example, processor 1810 may be a DSP similar to those found in digital baseband applications and may include the Tiger-SHARC DSP produced by Analog Devices.

Memory 1820 may be any of various computer-readable media, for example, a non-volatile recording medium, an integrated circuit memory element, volatile memory, or a combination thereof and may be implemented in numerous ways, such as, but not limited to, RAM, SRAM, DRAM, ROM, PROM, EPROM, EEPROM and the like. Memory 1820 may be a high speed cache of processor 1810.

Memory 1820 may be encoded with instructions, for example, as part of one or more programs that, as a result of being executed by processor 1810, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBAL, etc., or any of a variety of combinations thereof. Instructions may also be written in any of various low level languages, for example, using the native instruction set of processor 1810 or may be written as special instructions and stored as microcode or as firmware instructions. Memory 1820 may include one or more programs or software components including sequence generator 1822, state vector generator 1824, polynomial reshaper 1826, etc., as described in further detail below.

Various components of the transceiver may be coupled together by an interconnection mechanism 1815, which may include one or more busses (e.g., between components that are integrated within a same machine) and/or a network (e.g., between components that reside on separate discrete machines) using electrical or optical conductors, cables, wireless communications, etc. The interconnection mechanism 1815 enables communications (e.g., data, instructions, control) to be exchanged between system components of transceiver 1800.

In FIG. 18, various aspects of the present invention may be implemented as software components encoded in memory 1820 and capable of being executed by processor 1810. Memory 1820 may include instructions that implement a sequence generator, for example, as an LFSR. For example, sequence generator 1822 may include instructions that when executed on processor 1810 implement one or more characteristic polynomials such as those specified by CDMA2000, W-CDMA, etc. That is, sequence generator may be configured to generate a plurality of base sequences.

Memory 1820 may also include a state vector generator component 1824. The state vector generator component may include instructions, that when executed on processor 1810, compute an initial state vector from a mask associated with a an offset sequence and/or may compute a next state vector advanced from a current state vector of the sequence generator by a desired number of states.

Memory 1820 may further include polynomial reshaping component 1826. Polynomial reshaping component may include instruction that when executed on processor 1810 determine an expanded characteristic polynomial from a characteristic polynomial implemented by sequence generator 1822. Polynomial reshaping component 1826 may further include instructions capable of determining an expanded state vector associated with the expanded characteristic polynomial and corresponding to a same state vector associated with the characteristic polynomial.

It should be appreciated that the components encoded in memory 1820 need not be logically organized as illustrated in FIG. 18, but may interact in any of the various ways that will occur to those skilled in the art. For example, the various components may communicate with one another as separate components or modules or may be integrated into a single component.

Transceiver 1800 may also include a modulator/demodulator (modem) 1830 for encoding information signals with the PN sequences generated by the one or more components encoded in memory 1820. Accordingly, transceiver 1800 may transmit and receive signals, for example, signals 1835 transmitted and received by antenna 1840 according to any of various CDMA techniques. For example, transceiver may operate according to the CDMA2000 standard, UMTS standard, W-CDMA standard, and/or any other desired standard. Processor 1820 may be coupled to modem 1830 to handle any of various signal processing tasks involved in transmitting and/or receiving data communications.

Transceiver 1800 may be a base station that services multiple other transceivers in a particular geographical region. Accordingly, transceiver 1800 may store a plurality of masks associated with each of the other transceivers in a communications system such as a cellular network. Transceiver 1800 may also be a mobile device such as a cellular telephone. Accordingly, memory 1820 may encode a mask associated with a unique offset sequence assigned to the cellular phone.

As discussed above, an LFSR in SSRG form may be converted to an LFSR in MSRG form. However, this may be inconvenient and require a number of computations. Applicant has appreciated that it may be advantageous to incorporate various aspects of the present invention directly into a sequence generator having one or more LFSRs in SSRG form.

One embodiment according to the present invention is illustrated below in connection with PN sequences, sometimes referred to as scrambling codes in the UMTS environment. As also described above, an LFSR can be either be implemented in Modular Shift Register Generator (MSRG) or Simple Shift Register Generator (SSRG). UMTS chooses SSRG format for its scrambling code generation. Although SSRG can be equivalently transformed into MSRG, it may be more convenient and practical to enhance performance directly on SSRG.

Figure 19:
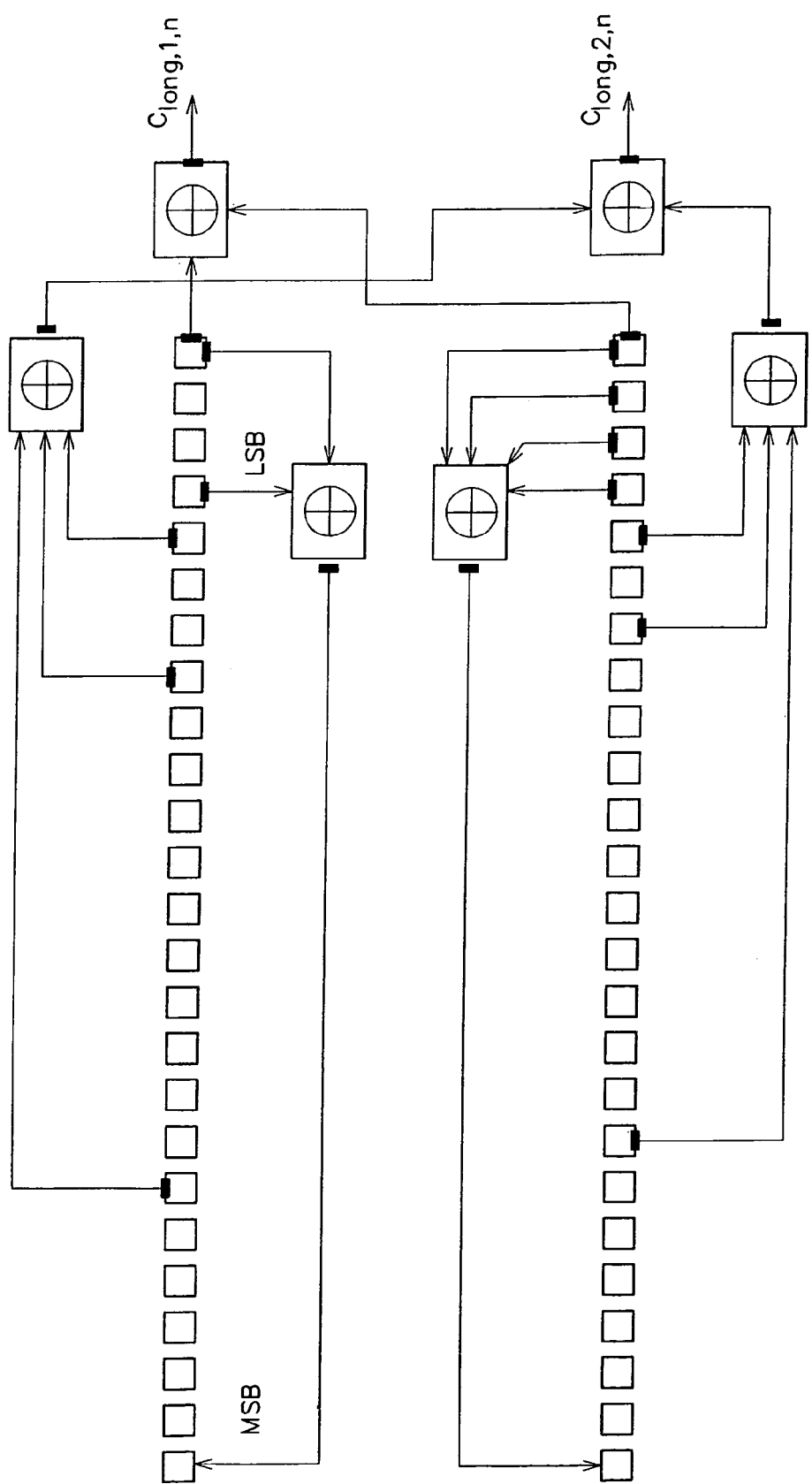
FIG. 19 illustrates an LFSR generating long scrambling codes according to the UMTS standard.

The diagram of the generation of long scrambling codes in UMTS is shown in FIG. 19. The long scrambling code is constituted of segments of Gold sequences based on two characteristic polynomials. The resulting complex code is given as, $$C_{long,n}(i) = c_{long,1,n}(i)(1 + j(-1)^i c_{long,2,n}(2\lfloor i/2 \rfloor)) \quad \text{Equation 31}$$

Figure 20:
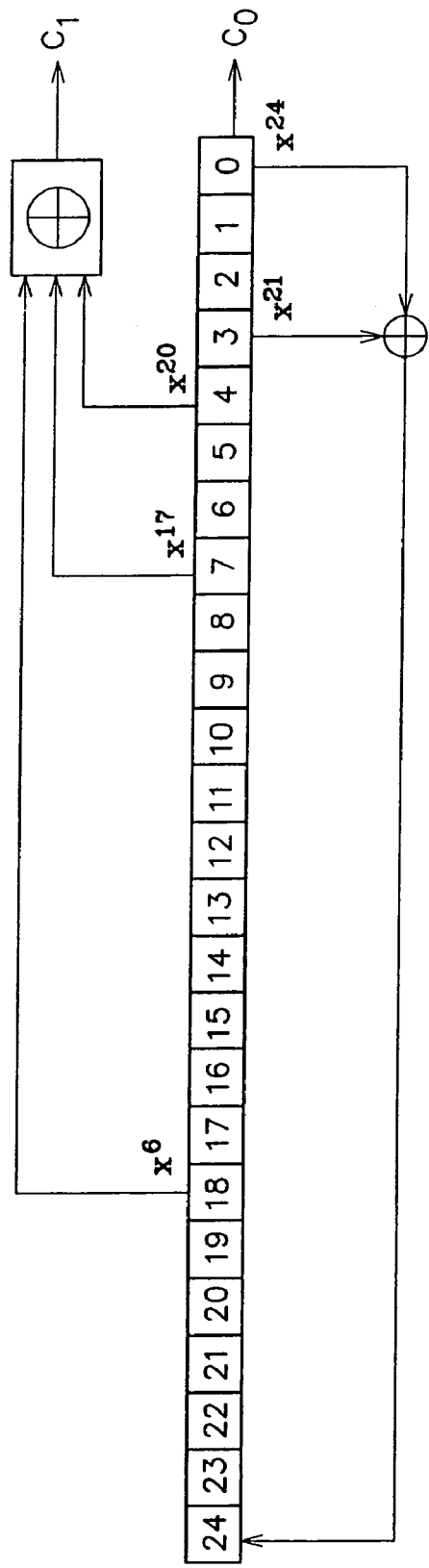
FIG. 20 illustrates one embodiment according to the present invention of an LFSR implementing long scrambling code generation enhancement.

The initial state of the second LFSR in FIG. 19 is pre-fixed. Then the 2 sequences resulting from it can be pre-generated and saved in memory. This is the first enhancement step with which the performance of scrambling code generation may be doubled. The following discussion is focused on the first LFSR code. One embodiment is illustrated in FIG. 20. The characteristic polynomial may be expressed as, $$p(x) = x^{25} + x^3 + 1 \quad \text{Equation 32}$$

It is often convenient to consider its reciprocal polynomial $$p^*(x) = 1 + x^{22} + x^{25} \quad \text{Equation 33}$$

The initial state of the register is $$r_{in}(x) = r_0 + r_1 x + r_2 x^2 + \ldots r_{23} x^{23} + r_{24} x^{24} \quad \text{Equation 34}$$

which corresponds to an initial polynomial $m_{in}(x)$ so that the polynomial of output $C_0$ may be expressed as, $$C_0(x) = x^{24} \cdot \frac{m_{in}(x)}{p^*(x)} \quad \text{Equation 35}$$
$$= r_0 + r_1 x + r_2 x^2 + \ldots + r_{23} x^{23} + r_{24} x^{24} + r_{25} x^{25} + \ldots$$

where $x^{24}$ is the mask for output $C_0$ according to PN coding theory. Similarly, the mask for output $C_1$ is $x^6 + x^{17} + x^{20}$, and the output is, $$C_1(x) = (x^6 + x^{17} + x^{20}) \cdot \frac{m_{in}(x)}{p^*(x)} \quad \text{Equation 36}$$
$$= (1 + x^3 + x^{14})(r_4 + r_5 x + r_6 x^2 + \ldots)$$

Applying polynomial reshaping technology, equation 35 becomes $$C_0(x) = \frac{x^{24} m_{in}(x) \cdot p^*(x)}{[p^*(x)]^2} = \frac{x^{49} x^{-25} m_{in}(x) \cdot p^*(x)}{[p^*(x)]^2} \quad \text{Equation 37}$$

The extended polynomial $[p^*(x)]^2$ enables the LFSR to output 44 bits in one cycle, which is 2 times of the original polynomial. The output mask $x^{49}$ insures that the output sequence comes out of the end of the shifting register. And initial state of the extended register is $$r_{in}'(x) = r_0 + r_1 x + r_2 x^2 + \ldots + r_{23} x^{23} + r_{24} x^{24} + \ldots + r_{48} x^{48} + r_{49} x^{49} \quad \text{Equation 38}$$

which corresponds to the new initial polynomial as $$m_{in}'(x) = x^{-25} m_{in}(x) \cdot p^*(x) \quad \text{Equation 39}$$

To achieve the same initial polynomial, which corresponds to the same initial register state, equation 36 becomes $$C_1(x) = (x^6 + x^{17} + x^{20}) \cdot \frac{m_{in}(x) \cdot p^*(x)}{[p^*(x)]^2} \quad \text{Equation 40}$$
$$= (x^{31} + x^{42} + x^{45}) \cdot \frac{x^{-25} m_{in}(x) \cdot p^*(x)}{[p^*(x)]^2}$$

Figure 21:
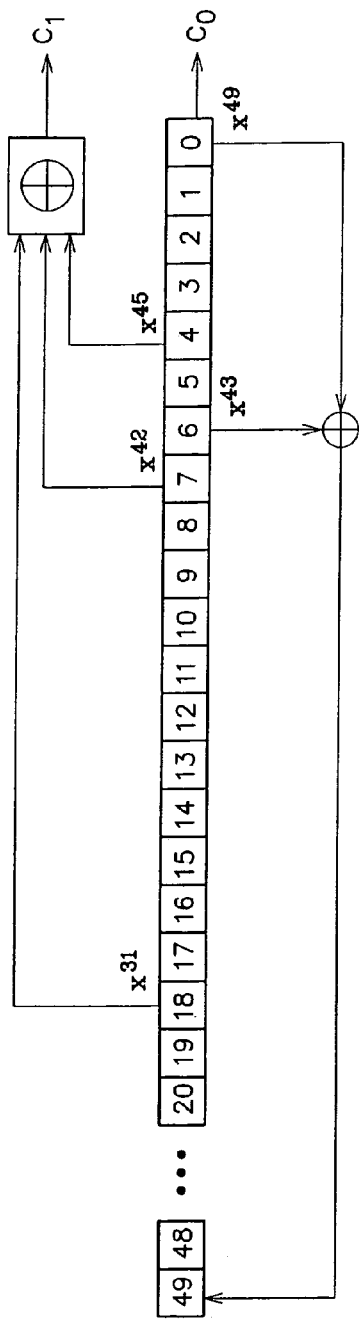
FIG. 21 illustrates one embodiment according to the present invention of an LFSR implementing a reshaped polynomial.

Thus the mask for $C_1$ with the extended polynomial becomes $x^{31} + x^{42} + x^{45}$. The LFSR based on the reshaped polynomial is illustrated in FIG. 21. The reshaped polynomial is $$[p^*(x)]^2 = 1 + x^{44} + x^{50} \quad \text{Equation 41}$$

Figure 22:
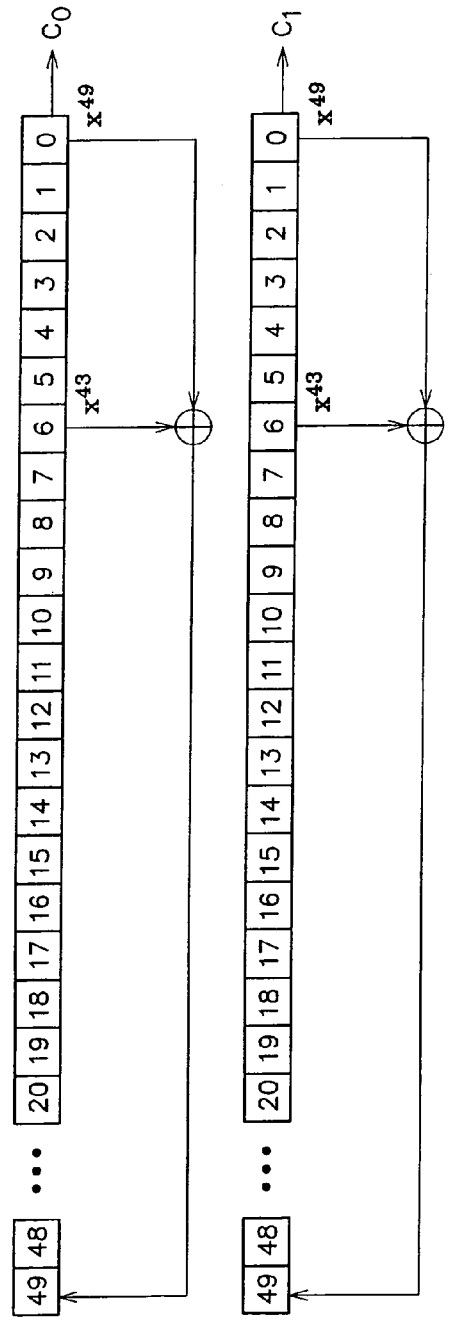
FIG. 22 illustrates one embodiment according to the present invention of an non-masked LFSR generating long scrambling codes according to the UMTS standard.

PN coding theory proves that the sequence $C_1$ is a shifted version of $C_0$. It can be generated in the same way as $C_0$ as shown in FIG. 22, but with different initial state of the LFSR register.

The initial state for $C_1$ can be simply computed as $$r'_0 = r_4 + r_7 + r_{18} \qquad \text{Equation 42}$$
$$r'_1 = r_5 + r_8 + r_{19}$$
$$\vdots$$
$$r'_{49} = r_{53} + r_{56} + r_{67}$$
$$\vdots$$
$$r'_{98} = r_{102} + r_{105} + r_{116}$$

where $r_4, r_5, \ldots, r_{67}$ are either the initial or the computed sequence of C0. There are several advantages including: 1) the two codes can be simultaneously generated on the two compute units of the TigerSHARC DSP with SIMD feature; 2) there is no 32-bit alignment problem in generating $C_1$; and 3) There may be only two feedback branches for generating $C_1$ in FIG. 22, whereas there are 3 branches in FIG. 21 to generate $C_1$.

The generation of the complex scrambling code may involve the additional process of $C_{long, 2, n}$. One embodiment of the procedure is as follows: The procedure is as follows: 1) mask the odd bits of $C_{long, 2, n}$; 2) shift the resulting sequence by 1 bit; 3) invert each bit of the shifted sequence; and 4) combine the reversed and the masked sequences.

The above operations may be applied to the 2 sequences from the first and the second LSFR before they are combined to form $C_{long, 2, n}$. It is noted that only one sequence needs to be reversed. This can be done on the sequence from the second LSFR since it is pre-generated.

Thus, for the sequence from the first LSFR, i.e $C_1$, the following process may be performed: 1) mask the odd bits of $C_1$; 2) shift the resulting sequence by 1 bit; and 3) combine the shifted and the masked sequences.

It can be shown with coding theory that the even bits of $C_1$ can be generated directly with the same LSFR but different initial state. The sequence is denoted as $C_1'$. Then the sequence may be interleaved with itself. Many DSPs provide convenient instructions to do the interleaving efficiently. The initial state to generate $C_1'$ is simply, $$r''_0 = r'_0 \qquad \text{Equation 43}$$
$$r''_1 = r'_2$$
$$\vdots$$
$$r''_{49} = r'_{98}$$

One embodiment of a procedure to implement various enhancement techniques according to the present invention includes:
1. Compute the 2 PN sequence generated by the $2^{nd}$ LFSR in FIG. 1 and save in 2 memory blocks respectively. Each code takes 38.4K bits of memory. The second sequence is pre-processed as described above.
2. With the given initial state for the $1^{st}$ LFSR, i.e. $r_0$, $r_1, \ldots, r_{24}$, compute the output sequence $r_{25}, r_{26}, \ldots, r_{116}$.
3. Compute $r_0', r_1', \ldots, r_{98}'$ and then $r_0'', r_1'', \ldots, r_{49}''$ according to equations 42 and 43 respectively.
4. Generate C0 and C1' on two compute unit with the initial state as $r_0, r_1, \ldots, r_{49}$ and $r_0'', r_1'', \ldots, r_{49}''$41 respectively. The diagram is shown in FIG. 22. The length of C1' is half of C0.
5. C1' is interleaved with itself to form a sequence of the same length as C0.
6. From the 2 memory blocks, load the PN sequences pre-generated in step 1. The combination of the pre-generated and the new codes gives the desired complex scrambling code.

It should be appreciated that various aspects of the present invention may be may be used alone, in combination, or in a variety of arrangements not specifically discussed in the embodiments described in the foregoing and is therefore not limited in its application to the details and arrangement of components set forth in the foregoing description or illustrated in the drawings.

The invention is capable of other embodiments and of being practiced or of being carried out in various ways. In particular, various aspects of the present invention including initial state vector computation, advanced state vector computation and polynomial reshaping may be employed in a sequence generator alone or any combination. In addition, the various components of a sequence generator incorporating the various aspects of the present invention may be implemented in hardware, firmware, software or any combination thereof.

Various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

What is claimed is:

1. A method of generating an offset sequence for use as a pseudo-random number (PN) code in a wireless communication, the method comprising acts of:
   generating a reference sequence;
   determining an initial state vector based at least in part on a mask associated with a first offset from the reference sequence, the initial state vector operating initially as a current state vector; and
   generating the offset sequence beginning at the initial state vector, the offset sequence offset from the reference sequence by the first offset, wherein generating the offset sequence includes generating a plurality of bits of the offset sequence on each of a plurality of iterations, each of the plurality of iterations comprising acts of:
   providing i bits of the current state vector as a portion of the offset sequence, i having a value greater than 1; and
   computing a subsequent state vector advanced at least i states from the current state vector, the subsequent state vector operating as the current state vector for a next iteration of the plurality of iterations.

2. The method of claim 1, wherein the acts of generating the reference sequence and generating the offset sequence include generating the reference sequence and the offset sequence at different phases of a base sequence.

3. The method of claim 2, wherein the act of determining the initial state vector includes an act of determining the initial state vector based at least in part on a characteristic polynomial associated with the base sequence.

4. The method of claim 3, wherein the act of determining the initial state vector includes an act of multiplying the mask by the characteristic polynomial.

5. The method of claim 3, wherein the act of determining the initial state vector includes an act of determining the initial state vector based at least in part on a current state vector associated with the reference sequence.

6. The method of claim 1, wherein the act of computing the subsequent state vector includes computing the subsequent state vector based on the current state vector and a characteristic-polynomial associated with the base sequence.

7. The method of claim 6, wherein the act of computing the subsequent state vector includes an act of computing the subsequent state vector based on at least one partial state vector associated with the current state vector and a truncated polynomial.

8. The method of claim 7, wherein the at least one partial state vector includes a first partial state vector and a second partial state vector and wherein the act of computing the subsequent state vector includes an act of computing a sum of the first partial state vector and a product of the second partial state vector and the truncated polynomial.

9. The method of claim 6, wherein i has a value based on an order difference of the characteristic polynomial.

10. The method of claim 6, wherein on each iteration, the act of computing a subsequent state vector includes an act of computing an expanded state vector having a number of bits simultaneously available greater than an order difference of the characteristic polynomial.

11. The method of claim 6, further comprising an act of expanding the characteristic polynomial to provide an expanded characteristic polynomial.

12. The method of claim 11, wherein the act of expanding the characteristic polynomial includes an act of expanding the characteristic polynomial such that an order difference of the expanded characteristic polynomial is greater than an order difference of the characteristic polynomial.

13. The method of claim 12, wherein i is equal to the order difference of the expanded characteristic polynomial.

14. The method of claim 11, wherein the act of expanding the characteristic polynomial includes at least one of applying coarse polynomial shaping, fine polynomial shaping and one-step polynomial reshaping.

15. A computer readable medium encoded with instructions for execution on at least one processor, the instructions, when executed on the at least one processor, performing a method of generating an offset sequence for use as a pseudo-random number (PN) code in a wireless communication, the method comprising acts of:
determining an initial state vector based at least in part on a mask associated with a first offset from the reference sequence, the initial state vector operating initially as a current state vector; and
generating the offset sequence beginning at the initial state vector, the offset sequence offset from the reference sequence by the first offset, wherein generating the offset sequence includes generating a plurality of bits of the offset sequence on each of a plurality of iterations, each of the plurality of iterations comprising acts of:
providing i bits of the current state vector as a first portion of the offset sequence, i having a value greater than 1; and
computing a subsequent state vector advanced at least i states from the current state vector, the subsequent state vector operating as the current state vector for a next iteration of the plurality of iterations.

16. The computer readable medium of claim 15, wherein the acts of generating the reference sequence and generating the offset sequence include generating the reference sequence and the offset sequence at different phases of a base sequence.

17. The computer readable medium of claim 16, wherein the act of determining the initial state vector includes an act of determining the initial state vector based at least in part on a characteristic polynomial associated with the base sequence.

18. The computer readable medium of claim 17, wherein the act of determining the initial state vector includes an act of multiplying the mask by the characteristic polynomial.

19. The computer readable medium of claim 17, wherein the act of determining the initial state vector includes an act of determining the initial state vector based at least in part on a current state vector associated with the reference sequence.

20. The computer readable medium of claim 15, wherein the act of computing the subsequent state vector includes computing the subsequent state vector based on the current state vector and a characteristic polynomial associated with the base sequence.

21. The computer readable medium of claim 20, wherein the act of computing the subsequent state vector includes an act of computing the subsequent state vector based on at least one partial state vector associated with the current state vector and a truncated polynomial.

22. The computer readable medium of claim 21, wherein the at least one partial state vector includes a first partial state vector and a second partial state vector and wherein the act of computing the subsequent state vector includes an act of computing a sum of the first partial state vector and a product of the second partial state vector and the truncated polynomial.

23. The computer readable medium of claim 20, wherein i has a value based on an order difference of the characteristic polynomial.

24. The computer readable medium of claim 20, further comprising an act of expanding the characteristic polynomial to provide an expanded characteristic polynomial.

25. The computer readable medium of claim 24, wherein the act of expanding the characteristic polynomial includes an act of expanding the characteristic polynomial such that an order difference of the expanded characteristic polynomial is greater than an order difference of the characteristic polynomial.

26. The computer readable medium of claim 25, wherein i is equal to the order difference of the expanded characteristic polynomial.

27. The computer readable medium of claim 24, wherein the act of expanding the characteristic polynomial includes at least one of applying coarse polynomial shaping, fine polynomial shaping and one-step polynomial reshaping.

28. The computer readable medium of claim 15, wherein on each iteration, the act of computing a subsequent state vector includes an act of computing an expanded state vector having a number of bits simultaneously available greater than an order difference of a characteristic polynomial associated with the base sequence.

29. A computer readable medium encoded with instructions for execution on at least one processor, the instructions, when executed on the at least one processor, performing a method for use with a sequence generator having a plurality of states adapted to produce an offset sequence for use as a pseudo-random number (PN) code in a wireless communication, the method comprising acts of:
receiving an input including a mask associated with a first offset of a reference sequence of the sequence generator; and
determining a first state of the plurality of states based on the input, the first state operating initially as a current state of the sequence generator, wherein when the first state is applied to the sequence generator, the offset sequence at the first offset from the reference sequence is provided, and wherein a plurality of bits of the offset sequence are generated on each of a plurality of iterations, each of the plurality of iterations including:
providing i bits of the current state of the sequence generator as a first portion of the offset sequence, i having a value greater than 1; and
computing a next state of the sequence generator advanced at least i states from the current state, the next state operating as the current state of the sequence generator on a next iteration of the plurality of iterations.

30. The computer readable medium of claim 29, wherein the act of receiving an input includes an act of receiving an input including a characteristic polynomial associated with the sequence generator.

31. The computer readable medium of claim 30, wherein the act of receiving the input includes an act of receiving an input including a current state of the sequence generator associated with the reference sequence.

32. The computer readable medium of claim 30, wherein the act of receiving the input includes an act of receiving an input including at least one pre-computed state of the sequence generator.

33. The computer readable medium of claim 30, wherein the act of determining one of the plurality of states includes an act of multiplying the characteristic polynomial by the mask.

34. The computer readable medium of claim 29, further performing an act of applying the first state to the sequence generator.

35. The computer readable medium of claim 29, wherein the act of computing the next state includes computing the next state based on the current state and a characteristic polynomial associated with the sequence generator.

36. The computer readable medium of claim 35, wherein the act of computing the next state includes an act of computing the next state based on at least one partial state vector associated with the current state and a truncated polynomial, the truncated polynomial truncated from the characteristic polynomial.

37. The computer readable medium of claim 36, wherein the at least one partial state vector includes a first partial state vector and a second partial state vector and wherein the act of computing the next state includes an act of computing a sum of the first partial state vector and a product of the second partial state vector and the truncated polynomial.

38. The computer readable medium of claim 37, wherein i has a value based on an order difference of the characteristic polynomial.

39. The computer readable medium of claim 38, further comprising an act of expanding the characteristic polynomial to provide an expanded characteristic polynomial.

40. The computer readable medium of claim 39, wherein the act of expanding the characteristic polynomial includes an act of expanding the characteristic polynomial such that an order difference of the expanded characteristic polynomial is greater than an order difference of the characteristic polynomial.

41. The computer readable medium of claim 40, wherein i is equal to the order difference of the expanded characteristic polynomial.

42. The computer readable medium of claim 39, wherein the act of expanding the characteristic polynomial includes at least one of applying coarse polynomial shaping, fine polynomial shaping and one-step polynomial reshaping.

43. The computer readable medium of claim 29, wherein on each iteration, the act of computing the next state includes an act of computing an expanded state having a number of bits available that is greater than an order difference of a characteristic polynomial associated with the sequence generator.

44. The computer readable medium of claim 29 in combination with a transceiver, the transceiver comprising:
a memory including the computer readable medium; and
a processor coupled to the memory, the processor adapted to execute the instructions encoded on the computer readable medium.

45. The combination of claim 44, in further combination with a plurality of transceivers, each of the plurality of transceivers comprising:
a memory including the computer readable medium; and
a processor coupled to the memory, the processor adapted to execute the instructions encoded on the computer readable medium.

46. The combination of claim 45, wherein at least one of the plurality of transceivers is a base station and wherein the memory includes a plurality of masks assigned to each respective other of the plurality of transceivers.

47. The combination of claim 45, wherein the memory of each of the plurality of transceivers includes a respective mask unique from masks of each other of the plurality of transceivers.

48. A sequence generator implemented in software stored on at least one computer readable medium, the sequence generator configured to generate an offset sequence for use as a pseudo-random number (PN) code in a wireless communication, the sequence generator comprising:
a first software component having a plurality of states, the first software component configured to generate a reference sequence and the offset sequence; and
a second software component adapted to receive at least one mask associated with an offset from the reference sequence, the second software component configured to determine an initial state from the plurality of states based at least in part on the at least one mask, the initial state operating initially as a current state of the sequence generator, wherein when the first software component is operated from the initial state, the first software component generates the offset sequence offset from the reference sequence by the offset,
wherein the first software component is adapted to simultaneously provide at least two bits of the current state associated with the reference sequence as a portion of the offset sequence on each of a plurality of iterations of the sequence generator, and wherein the second software component is further adapted to compute a next state advanced from the current state by at least two of the plurality of states on each of the plurality of iterations, the next state operating as the current state in a next iteration of the plurality of iterations.

49. The sequence generator of claim 48, wherein the reference sequence and the offset sequence are produced at separate phases of a base sequence.

50. The sequence generator of claim 49, wherein when the sequence generator is transitioned through each of the plurality of states, a period of the base sequence is generated.

51. The sequence generator of claim 50, wherein the base sequence is a maximal length pseudo noise sequence.

52. The sequence generator of claim 48, wherein the second software component is adapted to determine the initial state based at least in part on a characteristic polynomial.

53. The sequence generator of claim 48, wherein the second software component is adapted to determine the initial state based at least in part on a current state of the first component associated with the reference sequence.

54. The sequence generator of claim 48, wherein the number of bits provided simultaneously is equal to the number of states the next state is advanced from the current state.

55. The sequence generator of claim 48, wherein at least one of the at least two bits and the at least two states are the same in number as an order difference of a characteristic polynomial associated with the sequence generator.

56. The sequence generator of claim 48, wherein the second software component is adapted to increase a length of the plurality of states such that the at least two bits of the current state provided as the output sequence is increased in number.

57. The sequence generator of claim 48, wherein the second software component is adapted to generate an expanded state associated with the current state of the sequence generator associated with the offset sequence, the expanded state having a greater number of bits available simultaneously than each of the plurality of states.

58. The sequence generator of claim 57, wherein the expanded state is associated with an expanded characteristic polynomial having an order difference greater than an order difference of a characteristic polynomial associated with the sequence generator.

59. The sequence generator of claim 58, wherein the order difference of the expanded characteristic polynomial is increased from the order difference of the characteristic polynomial by applying at least one of course polynomial reshaping, fine polynomial reshaping, and one-step polynomial reshaping.

60. The sequence generator of claim 58, wherein the order difference of the expanded characteristic polynomial is a multiple of 8.

61. The sequence generator of claim 57, wherein the expanded state vector is determined based on a current state associated with the characteristic polynomial and an expansion operator associated with the characteristic polynomial.

62. The sequence generator of claim 48, in combination with a transceiver, the transceiver comprising:
- at least one processor coupled to the first component and the second software component;
- a modem coupled to the processor, the modem adapted to modulate and demodulate data with the offset sequence provided by the first software component.

63. The sequence generator of claim 62, wherein the transceiver further comprises a memory for storing a mask associated with an offset of the reference sequence.

64. The sequence generator of claim 48, in combination with a network, the network comprising a plurality of transceivers, each transceiver comprising:
- at least one processor coupled to the first software component and the second software component;
- a modem coupled to the processor, the modem adapted to modulate and demodulate data with the offset sequence provided by the first software component.

65. The sequence generator of claim 64, wherein at least one of the plurality of transceivers is a base station, the base station further comprising a memory for storing a plurality of masks associated with each other of the plurality of transceivers.

* * * * *